US012259960B2

(12) United States Patent
Murdoch et al.

(10) Patent No.: US 12,259,960 B2
(45) Date of Patent: Mar. 25, 2025

(54) DERIVED CHILD VERIFIABLE CREDENTIAL WITH SELECTIVE CLAIMS

(71) Applicant: Microsoft Technology Licensing, LLC, Redmond, WA (US)

(72) Inventors: Brandon Murdoch, Reading (GB); Ankur Patel, Sammamish, WA (US); Nithya Ganesh, Redmond, WA (US); Ronald John Kamiel Eurphrasia Bjones, Dilbeek (BE)

(73) Assignee: Microsoft Technology Licensing, LLC, Redmond, WA (US)

( * ) Notice: Subject to any disclaimer, the term of this patent is extended or adjusted under 35 U.S.C. 154(b) by 185 days.

(21) Appl. No.: 17/922,295

(22) PCT Filed: Apr. 27, 2021

(86) PCT No.: PCT/US2021/029442
§ 371 (c)(1),
(2) Date: Oct. 28, 2022

(87) PCT Pub. No.: WO2021/222284
PCT Pub. Date: Nov. 4, 2021

(65) Prior Publication Data
US 2023/0177137 A1    Jun. 8, 2023

(30) Foreign Application Priority Data
Apr. 28, 2020   (LU) ........................................ 101755

(51) Int. Cl.
*G06F 21/36*   (2013.01)
*G06F 21/62*   (2013.01)

(52) U.S. Cl.
CPC .............. *G06F 21/36* (2013.01); *G06F 21/62* (2013.01)

(58) Field of Classification Search
CPC ................................. G06F 21/36; G06F 21/62
See application file for complete search history.

(56) References Cited

U.S. PATENT DOCUMENTS

| 9,300,644 | B1 * | 3/2016 | Dubey ..................... H04L 63/08 |
| 9,411,892 | B2 * | 8/2016 | Ravid ..................... G06F 16/93 |
| 9,608,993 | B1 * | 3/2017 | Camenisch ......... H04W 12/082 |
| 11,038,883 | B2 * | 6/2021 | Yang ........................ G06F 21/31 |
| 2004/0056087 | A1 * | 3/2004 | Bonneau, Jr. ........ G06Q 20/346 |
| | | | 235/380 |

(Continued)

OTHER PUBLICATIONS

Verifiable Credentials Data Model 1.0 (Sporny) (Year: 2019).*

(Continued)

*Primary Examiner* — Samson B Lemma
*Assistant Examiner* — Richard W Cruz-Franqui
(74) *Attorney, Agent, or Firm* — Workman Nydegger

(57) ABSTRACT

Permitting a claims holder to get a limited verifiable credential leveraging off of a previously-issued verifiable credential. This is done by having the limited verifiable credential include only a selected subset of the verifiable claims present within the previously-issued verifiable credential. The limited verifiable credential may then be exposed to a relying entity computing system so that the relying entity computing system can verify any of the selected subset of verifiable claims, but not verifiable claims that are outside of the selected subset of verifiable claims.

18 Claims, 27 Drawing Sheets

(56) References Cited

U.S. PATENT DOCUMENTS

| | | | |
|---|---|---|---|
| 2009/0089870 A1* | 4/2009 | Wahl | H04L 63/0823 |
| | | | 726/9 |
| 2014/0181927 A1* | 6/2014 | Sarkissian | H04L 63/083 |
| | | | 726/6 |
| 2014/0281525 A1* | 9/2014 | Acar | H04L 9/3226 |
| | | | 713/168 |
| 2016/0352717 A1* | 12/2016 | Shewchuk | H04L 63/0853 |
| 2016/0378741 A1* | 12/2016 | Mullins | G06F 40/20 |
| | | | 715/230 |
| 2017/0124303 A1* | 5/2017 | Baldwin | G06F 21/105 |
| 2017/0149563 A1* | 5/2017 | Camenisch | H04L 9/30 |
| 2018/0189738 A1* | 7/2018 | Ramaswamy | G06Q 10/107 |
| 2018/0300217 A1* | 10/2018 | Doggett | G06F 11/3476 |
| 2018/0357562 A1* | 12/2018 | Hofman | G06N 5/022 |
| 2019/0087829 A1* | 3/2019 | Mercury | G06F 3/011 |
| 2019/0222424 A1* | 7/2019 | Lindemann | H04L 9/0861 |
| 2019/0230073 A1 | 7/2019 | Patel et al. | |
| 2020/0076601 A1* | 3/2020 | Tabrizi | H04L 9/0637 |
| 2021/0036866 A1* | 2/2021 | Zolfonoon | H04L 67/34 |
| 2021/0174914 A1* | 6/2021 | Cano | H04L 9/0825 |

OTHER PUBLICATIONS

NPL Search History (Year: 2024).*
"Search Report Issued in Luxembourg Patent Application No. LU101755", Mailed Date: Nov. 18, 2020, 7 Pages. (MS# 407870-LU-NP).
"International Search Report and Written Opinion Issued in PCT Application No. PCT/US21/029442", Mailed Date: Aug. 13, 2021, 11 Pages. (MS# 407870-WO-PCT).
Communication pursuant to Article 94(3) EPC, Received for European Application No. 21726013.2, (MS# 407870-EP01-PCT) mailed on Jun. 4, 2024, 8 pages.

* cited by examiner

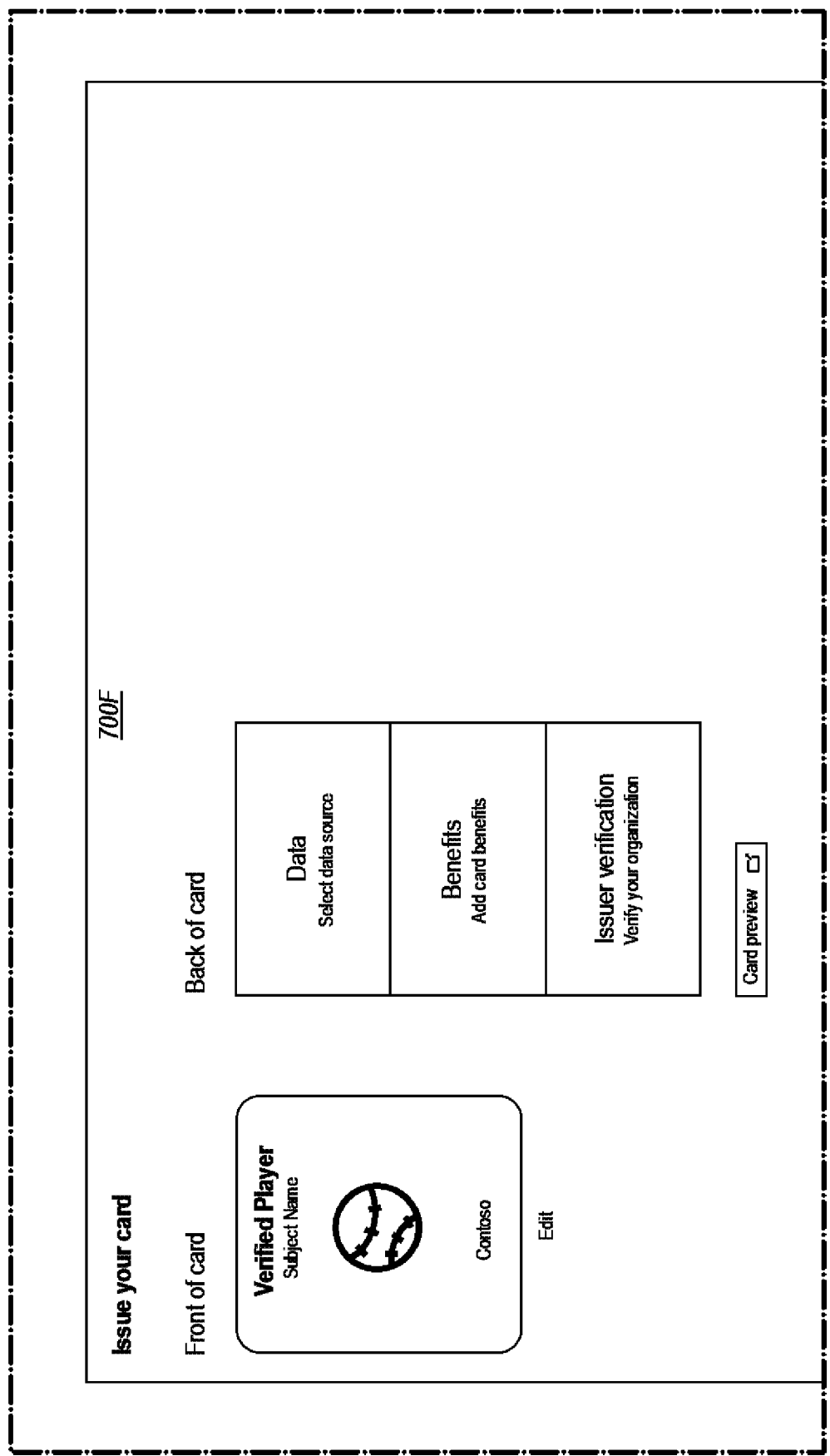

FIG. 8D

Portable Identity Cards - Accept cards

Overview
Key stores
Identifiers
Issue cards
Accept cards
Transaction history
Cards I accept

| Transaction date | Card ID | Issuer | App | Response from Issuer |
|---|---|---|---|---|
| 23 August 2019 | didion:abc123 | Contoso | Data manager | Valid |
| 23 August 2019 | didion:abc123 | Contoso | Data manager | Valid |
| 23 August 2019 | didion:abc123 | Contoso | Data manager | No response |
| 23 August 2019 | didion:abc123 | Contoso | Data manager | Valid |

DERIVED CHILD VERIFIABLE CREDENTIAL WITH SELECTIVE CLAIMS

CROSS-REFERENCE TO RELATED APPLICATIONS

The present application is a U.S. National Stage of International Application No. PCT/US2021/029442, filed on Apr. 27, 2021, designating the United States and claiming the priority of Luxembourg Patent Application No. LU101755 filed with the Luxembourg Intellectual Property Office on Apr. 28, 2020. All of the aforementioned applications are incorporated herein in their respective entireties by this reference.

BACKGROUND

A digital identity is a mechanism to keep track of an entity across different digital contexts. After an identity is determined, appropriate action can be taken related to the entity that has the identity. As an example, authorizations, privileges, customizations and access can be provided to the entity. Thus, digital identities are an important mechanism to ensure that information is restricted to appropriate trust boundaries via appropriate containment of authorizations and privileges. Digital identities are also an important mechanism to ensure a positive and consistent user experience when accessing their data and customizations.

Existing computing technologies provide for a data structure called a "verifiable credential". In these technologies, a claims issuer makes one or more claims about a subject, and generates the verifiable credential. The verifiable credential include those claim(s) as well as proof instructions (e.g., metadata) to prove that claim(s) have not been tampered with and were indeed issued by the claims issuer. The claims issuer then provides the verifiable credential to a claims holder, for presentation to any relying party that relies upon the veracity of those claims.

As an example, the claims issuer might be a computing system associated with a government agency in charge of issuing driver's licenses. The government agency may generate a verifiable credential with claims about a citizen, such as the birthdate, residence address, weight, eye color, hair color, authorization to drive, restrictions on authorization to drive, and so forth. The government agency issues the verifiable credential to the citizen. If the user is stopped by law enforcement, the citizen may present the verifiable credential, whereby a computing system associated with law enforcement may use the proof instructions to verify that the claims were issued by the government agency and indeed have not been tampered with since issuance. In another example, an organization that provides inoculations may issue claims to a parent of a child that the child has received certain inoculations, which the parent may then present to a school where the child is to attend.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Existing computing technologies provide for a data structure called a "verifiable credential". In these technologies, a claims issuer makes one or more claims about a subject, and generates the verifiable credential. The verifiable credential includes those claim(s) as well as proof instructions (e.g., metadata) to prove those claim(s) have not been tampered with and were indeed issued by the claims issuer. The claims issuer then provides the verifiable credential to a claims holder, for presentation to any relying party that relies upon the veracity of those claims.

As an example, the claims issuer might be a computing system associated with a government agency in charge of issuing driver's licenses. The government agency may generate a verifiable credential with claims about a citizen, such as the birthdate, residence address, weight, eye color, hair color, authorization to drive, restrictions on authorization to drive, and so forth. The government agency issues the verifiable credential to the citizen. If the user is stopped by law enforcement, the citizen presents the verifiable credential, whereby a computing system associated with law enforcement uses the proof instructions to verify that the claims were issued by the government agency and indeed have not been tampered with since issuance. In another example, an organization that provides inoculations issues claims to a parent of a child that the child has received certain inoculations, which the parent then presents to a school where the child is to attend.

However, it may be that the claims holder does not want the relying party to be able to know all of the claims within a verifiable credential. Consider as an example a case in which the claims holder would like to present her digital driver's license in order to identify who she is to a relying party, but does not want to disclose her age to the relying party. As an example, the relying party might be a library, which really has no need to know the age of the claims holder. Under existing technology, the relying party would not only be able to verify the claims holder's identity, but also perhaps other more sensitive information as well.

The principles described herein permit the claims holder to get a more limited verifiable credential leveraging off of a previously-issued verifiable credential. As an example, a claims holder might be able to provide their digital driver's license to the government agency that issued the digital driver's license in the first place, and ask for a more limited verifiable credential that lists a fewer number of claims (e.g., that the government agency asserts that the claims holder has a particular name and address, without stating the age of the claims holder).

Accordingly, embodiments disclosed herein relate to the acquisition and use of a verifiable credential (called herein a "child verifiable credential") so as to restrict access to one or more verifiable claims of another verifiable credential (called herein a "parent verifiable credential"). This is done by having the child verifiable credential include only a selected subset of the verifiable claims present within the parent verifiable credential. The method includes obtaining the child verifiable credential that is derived from the parent verifiable credential, and that includes only a subset of the verifiable claims that are in the parent verifiable credential. The method then includes exposing the obtained child verifiable credential to a relying entity computing system so that the relying entity computing system can verify any of the selected subset of verifiable claims, but not verifiable claims that are outside of the selected subset of verifiable claims.

In some embodiments, at least one or some of the verifiable claims may have a subject referenced by a decentralized identifier. Thus, the principles described herein may be used to acquire and use verifiable credentials that have claims about decentralized identities.

In some embodiments, the child verifiable credential is obtained by selecting the subset of verifiable claims from the parent verifiable credential, and causing a request to be transmitted to a claims issuer computing system for the child verifiable credential that includes the selected subset of verifiable claims to be generated from the parent verifiable credential. After the claims issuer computing system transmits the requested child verifiable credential to the claims holder computing system, the claims holder computing system detects receipt of the requested child verifiable credential.

In some embodiments, the child verifiable credential takes the form of a data structure that represents a property name and value of each of the subset of verifiable claims. In one embodiment, this data structure is used to cause a visual representation to be displayed to the user, the visual representation representing the property name and value for each of the subset of verifiable claims.

In some embodiments, the data structure also represents the child verifiable credential as well as usage data of the child verifiable credential. The usage data can include the frequency with which the verifiable credential is exposed to relying party computing systems, an identity of a relying party computing system to which the verifiable credential was last exposed, and/or a time that the verifiable credential was last exposed. Thus, the user may gain a comprehensive view of usage of the verifiable credential over time.

In some embodiments, the visual representation of the verifiable credential comprises a human readable visual representation of the property name and value for each of one, some, or potentially all of the verifiable claims within the verifiable credential. Alternatively, or in addition, the visual representation may comprise a machine-readable representation, such as a bar code or QR code, of the property name and value for each of one, some or all of the verifiable claims within the verifiable credential. Alternatively, or in addition, the proof instructions may also be presented in the visual representation in human-readable or machine-readable form. Thus, even without an electronic connection with the claim holder's computing system or device, humans or even machines may easily read and interpret what is being claimed, and the machine may additionally interpret how to prove the claims have been made by the claims issuer and have not been tampered with since the time that the claims were made by the claims issuer.

In some embodiments, the selection of the subset of verifiable claims occurs in response to detecting predetermined user interaction with the visual representation. Thus, the user may maintain control over what claims are exposed by appropriately interacting with the claim holder's computing system.

In some embodiments, the value of at least one of the properties comprises a location that points to a value for the property name. Thus, dynamic claims are enabled in which the location remains fixed, but the value contained in the location that is pointed to might change. Thus, dynamically changing claims may be asserted within the verifiable claim that points to another location. As an example, there may be a claim that asserts that a subject's goals are located within a particular location. The relying party then has the ability to retrieve those goals from the location specified in the claim.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which:

FIGS. 7A through 7F illustrate a sequence of user interfaces in which an issuer creates a portable identity card template that will be used to create portable identity cards for various holders;

FIGS. 8A through 8F illustrate a sequence of user interfaces in which a holder obtains a portable identity card generated from the portable identity card template of FIGS. 7A through 7F;

FIGS. 10A through 10C illustrate additional user interfaces that allow the user to manage portable identity cards;

DETAILED DESCRIPTION

The principles described herein relate to the acquisition and use of child verifiable credential from a parent verifiable credential, in order to restrict disclosure of claims to less than all of the claims made in the parent verifiable credential. Verifiable credentials themselves are known in the art. One conventional implementation of a verifiable credential is described by a W3C Recommendation dated Nov. 19, 2019 in a document entitled "Verifiable Credentials Data Model 1.0."

In order to introduce the reader to the concept of a verifiable credential, an example verifiable credential 100 will first be described with respect to FIG. 1. Furthermore, an environment 200 in which a verifiable credential is created and used will then be described with respect to FIG. 2. The principles of the present invention will then be described with respect to FIGS. 3 through 13.

As used herein, an "issuer" is an entity that makes at least one assertion about a subject. That assertion is also called herein a "claim". A "credential" is a set of one or more claims. A "verifiable credential" is a credential in which cryptographic mechanisms (such as a digital signature) are used to detect whether the credential has been tampered with since the time that the credential was issued, and can be used to verify identity of the issuer of the credential. Claims within a verifiable credential need not be about the same subject, and the subject of any claim need not be the same as a holder of the verifiable credential.

Figure 1:
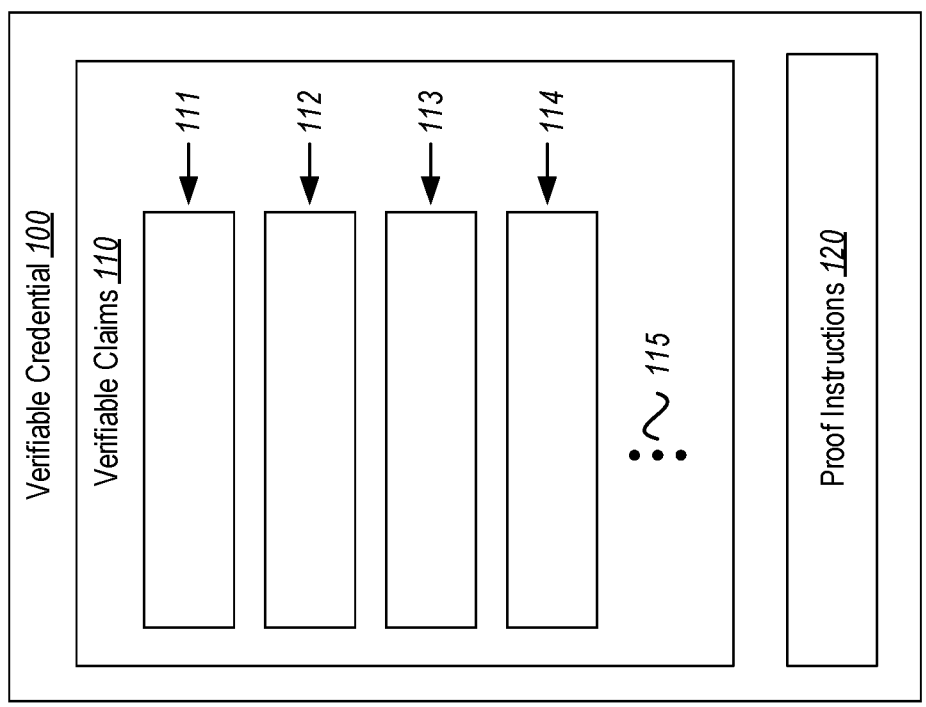
FIG. 1 illustrates a verifiable credential that includes multiple verifiable claims, and proof instructions for proving the claims were made by an issuer.

FIG. 1 illustrates a verifiable credential 100 that includes multiple verifiable claims 110. The verifiable claims 110 are shown as including four verifiable claims 111 through 114, though the ellipsis 115 represents that the verifiable credential 100 may include any number (one or more) of verifiable claims. The verifiable credential 110 also includes proof instructions 120 that are used to verify that the verifiable credential 100 has not been tampered with since the verifiable credential 100 was created by the issuer of the verifiable credential 100, and to verify the identity of the issuer of the verifiable claims 110. An example of a proof instruction is a digital signature of the issuer.

Figure 2:
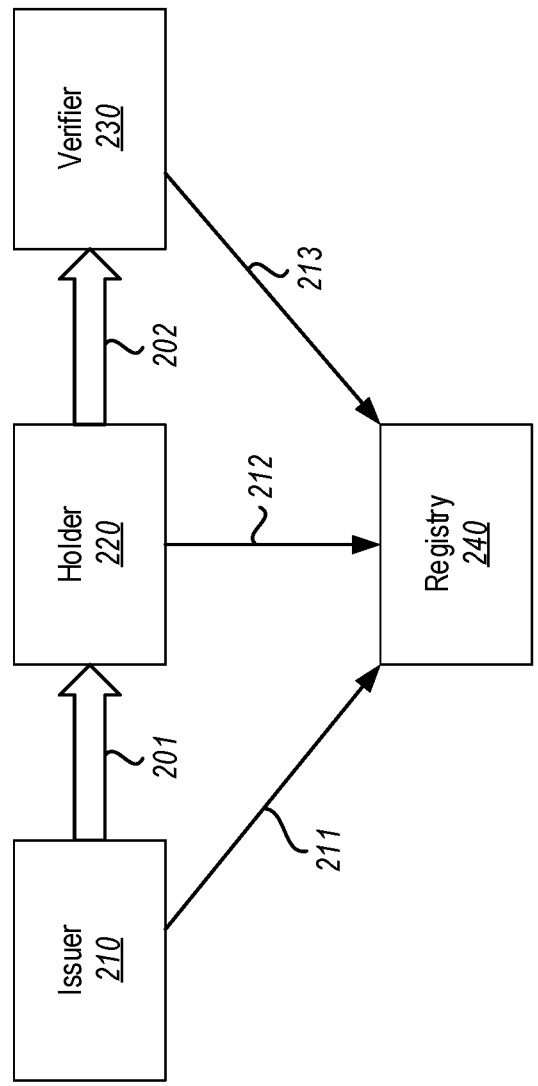
FIG. 2 illustrates an environment in which a verifiable credential (such as the verifiable credential of FIG. 1) is created and used.

FIG. 2 illustrates an environment 200 in which a verifiable credential (such as verifiable credential 100 of FIG. 1) is created and used. The environment 200 includes an issuer computing system 210 that operates within a sphere of trust of an issuer. Examples of issuers include corporations, organizations, associations, governments, agencies, individuals, or any other entity that can make assertions that could be relied upon by others. The issuer performs the role of asserting claims, causing the issuer computing system 210 to create a verifiable credential (such as verifiable credential 100 of FIG. 1) for these claims, and causing the issuer computing system 210 to transmit the verifiable credential to a holder computing system 220 as represented by arrow 201. The issuer computing system 210 may also be referred to herein as simply "issuer 210". As represented by arrow 211, the issuer 210 also transmits verify identifiers and use schemas to a registry computing system 240.

As also represented by arrow 201, a holder computing system 220 acquires the transmitted verifiable credential. The holder computing system 220 operates on behalf of a holder, who uses the holder computing system 220 to possess and potentially store the verifiable credential. As represented by arrow 202, the holder also causes the holder computing system to present the verifiable credential to a verifier computing system 230. The holder computing system 220 may also be referred to herein as simply "holder 220". As represented by arrow 212, the holder 220 also transmits identifiers and use schemas to the registry computing system 240.

The holder 220 presents the verifiable credential itself, or presents data from the verifiable credential in the form of another data structure, which may also be referred to herein as a "verifiable presentation". A verifiable presentation expresses data from one or more verifiable credentials, and is packaged in such a way that the authorship of the data is verifiable. If verifiable credentials are presented directly, they become verifiable presentations. Data formats derived from verifiable credentials that are cryptographically verifiable, but do not of themselves contain verifiable credentials, are also included within the definition of a verifiable presentation.

As also represented by the arrow 202, a verifier computing system 230 acquires the transmitted verifiable credential (optionally within a verifiable presentation). The verifier computing system 230 operates on behalf of a verifier, which is a relying party that relies on one or more claims made in the verifiable credential. The verifier computing system 230 evaluates whether a verifiable credential is an untampered with (and unexpired) statement of the issuer 210. This includes following any proof instructions (e.g., proof instructions 120) that are present within the verifiable credential (e.g., verifiable credential 100). The verifier computing system 230 then may take action based on this verification, such as treating the claim(s) made in the verifiable credential as being valid and issued by the issuer 210. The verifier computing system 230 will sometimes also be referred to hereinafter as "verifier 230". As part of the verification, the verifier 230 sends verify identifiers and schemas to the registry computing system 240, as represented by arrow 213.

The registry computing system 240 mediates the creation and verification of identifiers, keys, verifiable credential schemas, revocation registries, issuer public keys, and so on. Example verifiable data registries include trusted databases, decentralized databases, and distributed ledgers. Each of the issuer computing system 210, the holder computing system 220, the verifier computing system 230, and the registry computing system 240 is structured as described below for the computing system 1300 of FIG. 13.

Accordingly, FIGS. 1 and 2 describe verifiable credentials and dataflows associated with the creation and use of verifiable credentials. However, the inventors have recognized that portability of the verifiable credential is important in improving utility of the verifiable credential. As an example, such portability includes the ability to efficiently issue verifiable credentials to multiple holders, and the ability for any given holder to utilize the verifiable credential at different locations, and even with the verifiable credential being presented using multiple devices under the control of the holder (e.g., holder 220). Tracking usage of a verifiable credential in such a manner can become quite difficult. However, there is presently no mechanism for keeping track of how a verifiable credential is being used, let alone how the verifiable credential is used if multiple devices are employed to present the verifiable credential.

Figure 3:
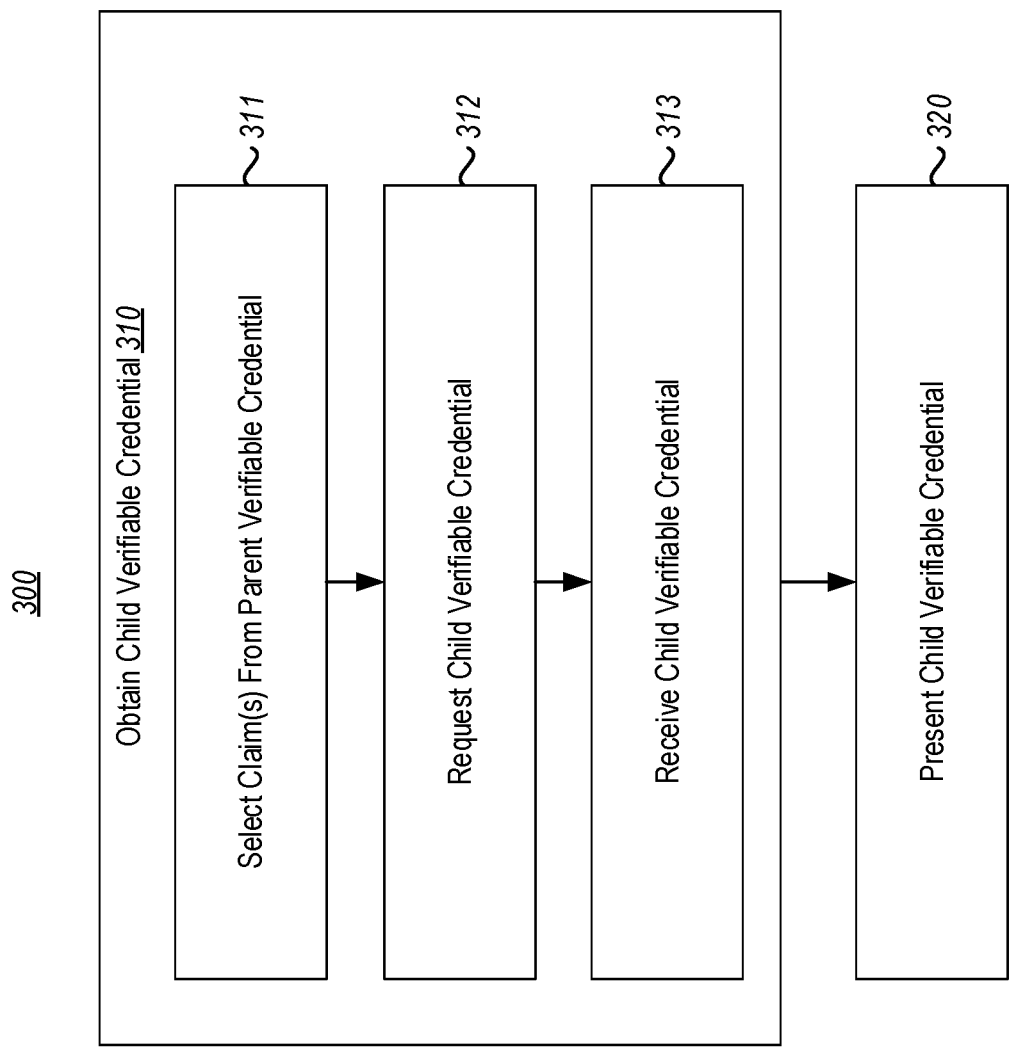
FIG. 3 illustrates a flowchart of a method for acquiring and using a child verifiable credential that includes a selected subset of verifiable claims that are present within a parent verifiable credential, in accordance with the principles described herein.

FIG. 3 illustrates a flowchart of a method 300 for acquiring and using a child verifiable credential that includes a selected subset of verifiable claims that are present within a parent verifiable credential, in accordance with the principles described herein. The method 300 is performed by a computing system, such as the computing system 1300 described below with respect to FIG. 13. In that case, the computing system 1300 performs the method 300 in response to the at least one hardware processing unit 1302 executing computer-executable instructions that are stored on the memory 1304. Accordingly, the computer-executable instructions are specially structured to cause the computing system 1300 to perform the method 300. In one embodiment, the method 300 is performed by a holder computing system, such as the holder computing system 220 of FIG. 2.

Figure 4:
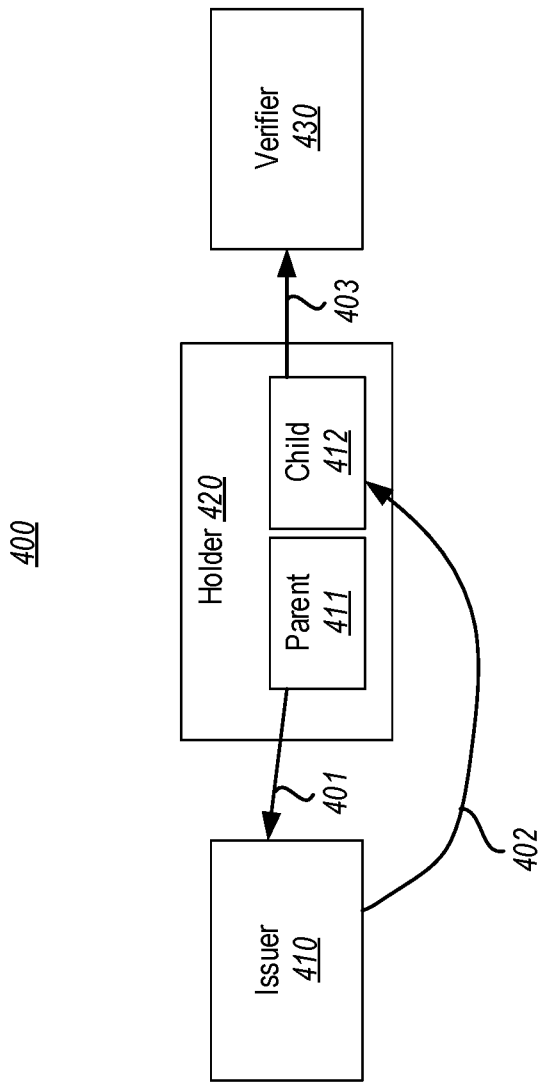
FIG. 4 illustrates an environment in which a holder computing system acquires and presents a child verifiable credential, in accordance with the principles described herein.

FIG. 4 illustrates an environment 400 in which a holder computing system 420 acquires and presents a child verifiable credential 412, in accordance with the principles described herein. The child verifiable credential 412 is derived from a parent verifiable credential 411. The holder computing system 420 acquires the child verifiable credential 412 from the issuer computing system 410, and presents the child verifiable credential 412 to the verifier computing system 430. In one embodiment, the holder computing system 420 is the holder computing system 220 of FIG. 2, the issuer computing system 410 is the issuer computing system 210 of FIG. 2, and the verifier computing system 430 is the verifier computing system 230 of FIG. 2. As the method 300 of FIG. 3 is performed in the environment 400 of FIG. 4, the method 300 of FIG. 3 will now be described with frequent reference to the environment 400 of FIG. 4.

The method includes the holder computing system obtaining a child verifiable credential that is derived from a parent verifiable credential (act 310). In FIG. 4, the parent verifiable credential is the parent verifiable credential 411, and the child verifiable credential is the child verifiable credential 412. FIG. 4 shows a state in which the holder computing system 410 has already obtained the child verifiable credential and thus shows a state of the environment 400 after act 310 has already been performed. Prior to act 410 being performed, the holder computing system 420 would not yet have possession of the child verifiable credential 412.

The child verifiable credential 412 is modified with the term "child", and the parent verifiable credential 411 is modified with the term "parent". This nomenclature is used to emphasize that the child verifiable credential 412 is derived from the parent verifiable credential 411. The child verifiable credential 412 includes one or more, but less than all, of the claims that are included within the parent verifiable credential. Obtaining and presenting a child verifiable credential will be useful if the holder computing system wanted to present some, but not all, of the verifiable claims within a verifiable credential.

The obtaining of the child verifiable credential (act 310) includes a number of constituent acts, including acts 311, 312 and 313. Specifically, the holder computing system selects a subset of verifiable claims from the parent verifiable credential (act 311). Referring to FIG. 4, the holder computing system 420 selects a subset of the claims within the parent verifiable credential 411. In an illustrative example that will be called herein the "subject example"), suppose that the parent verifiable credential 411 is structured as described above for the verifiable credential 100 of FIG. 1, and that the holder computing system 420 selects claims 111 and 113, but not claims 112 and 114.

The selection of the subset of verifiable claims is performed in response to the holder or an agent of the holder interfacing with the holder computing system 420). In one example, the verifiable credential is represented within a data structure called herein a "portable identity card". A visualization of the portable identity card is presented to the user, and the user may interact with the visualization in a predetermined manner so as to cause the subset of claims to be selected.

Returning to FIG. 3, after the subset of claims is selected (act 310), the holder computing system causes a request to be transmitted to a claims issuer computing system for the child verifiable credential that includes the selected subset of verifiable claims (act 312). In FIG. 4, this transmission is represented by arrow 401. The request 401 includes enough information for the issuer computing system 410 to identify the parent verifiable credential 411, and to identify the selected subset of claims. The issuer computing system 410 then generates a new verifiable credential (i.e., the child verifiable credential 412) that includes the selected subset of verifiable claims, but does not include the claims of the parent verifiable credential that were not in that subset. As represented by arrow 402, the issuer computing system 410 then transmits the child verifiable credential 412 to the holder computing system 420.

Figure 5:
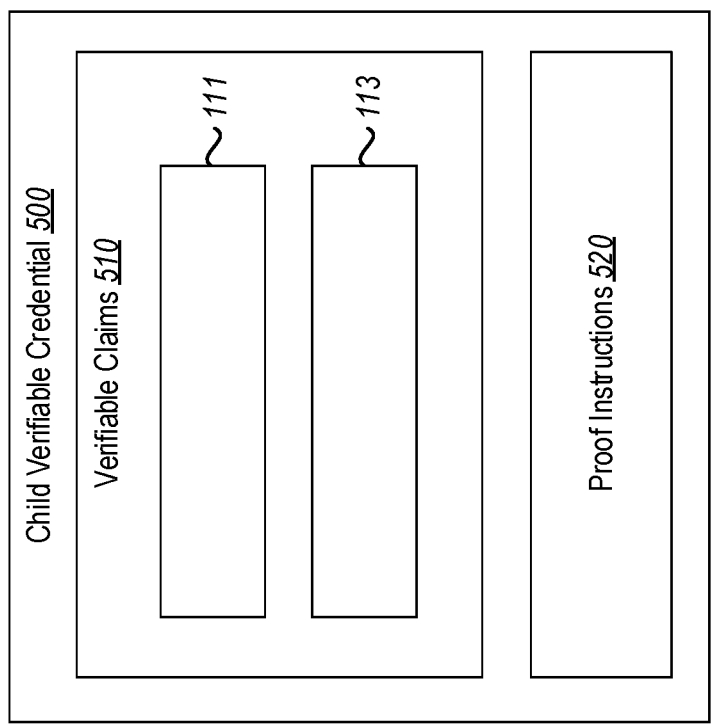
FIG. 5 illustrates a verifiable credential that represents an example of the child verifiable credential of FIG. 4.

FIG. 5 illustrates a verifiable credential 500 that represents an example of the child verifiable credential 412 of FIG. 4. The verifiable credential 500 includes a set of verifiable claims 510 and proof instructions 520 for verifying the verifiable claims. Specifically, in the subject example in which the parent verifiable credential 411 took the form of the verifiable credential 100 of FIG. 1, the holder computing system selected the claims 111 and 113 from the parent verifiable credential 411. Accordingly, the verifiable claim set 410 includes the selected claims 111 and 113, but does not include the claims 112 and 114 that were not selected from the parent verifiable credential.

Returning to FIG. 3, the holder computing system detects receipt of the child verifiable credential (act 313), thereby completing the act of obtaining the child verifiable credential (act 310). The holder computing system then exposes the child verifiable credential to a verifying computing system (act 320), so that the verifier computing system follows the proof instructions to verify claims in the child verifier credential. For instance, in FIG. 4, the holder computing system 420 receives (as represented by arrow 402) the child verifiable credential 412 from the issuer computing system 410. The holder computing system 420 then presents (as represented by arrow 403) the child verifiable credential to the verifying computing system 430.

The issuer computing system 410 generates the verifiable credential 412 in the same way that verifiable credential 411 was created, the difference being that the claims included within the child verifiable credential are a smaller set of those claims that were included within the parent verifiable credential. An example issuer experience associated with generating verifiable credentials is described below with respect to FIGS. 7A through 8F. An example holder experience associated with presenting verifiable credentials is described below with respect to FIGS. 9A through 10C. Although the verifiable credential need not be represented within a portable identity card, the verifiable credential is represented within a portable identity card in some embodiments. Accordingly, a portable identity card and associated user experience will now be described with respect to FIGS. 6 through 10C.

Figure 6:
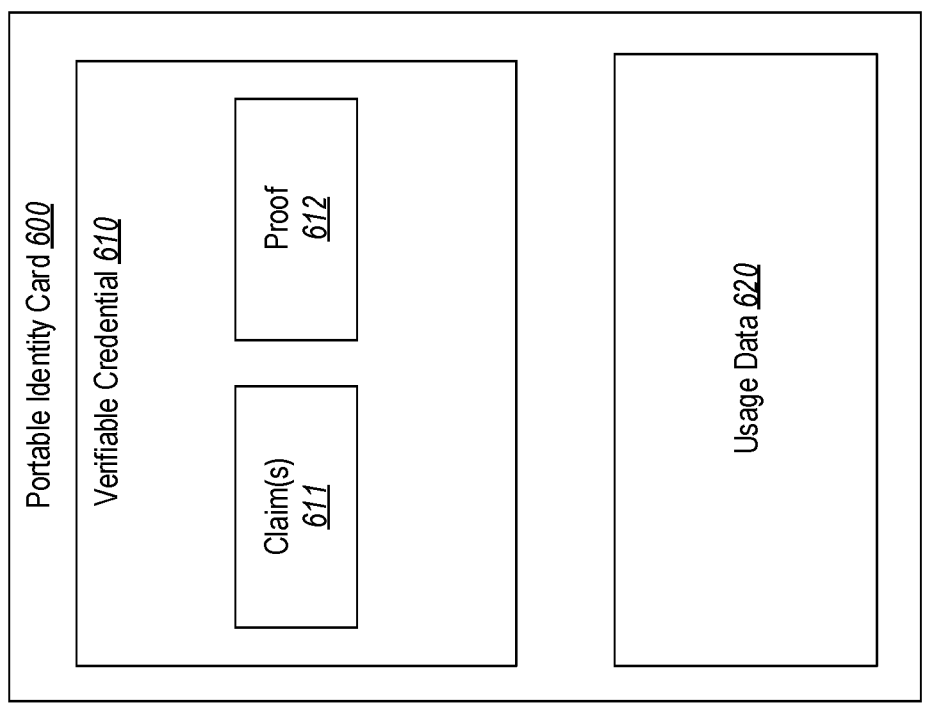
FIG. 6 illustrates a portable identity card data structure that includes a verifiable credential and usage data.

FIG. 6 illustrates a data structure 600 that represents one example of how a portable identity card is represented in storage and/or memory of a computing system of a claims holder. The portable identity card data structure 600 includes a verifiable credential 610 as well as usage data 620 of that verifiable credential. The verifiable credential 610 includes one or more claims 611 as well as proof instructions 612 for verifying integrity of the claims, and validating that the claims were made by an issuer identified within the claims. Accordingly, in one example, the verifiable credential 610 is the verifiable credential 100 of FIG. 1.

The verifiable credential 610 is included in the portable identity card data structure 600 in the sense that the portable identity card data structure 600 is used to access the verifiable credential 610. In one example, the verifiable credential 610 is expressly included within the portable identity card data structure 600. Alternatively, the verifiable credential 610 is referenced in the portable identity card data structure 600. As an example, the portable identity card data structure 600 includes a pointer to (or an identifier of) the verifiable credential.

The same is true of the usage data 620. That is, in one example, the usage data 620 is included in the portable identity card data structure 600 in the sense that the portable identity card data structure 600 is used to access the usage data 620. In one example, the usage data 620 is expressly included within the portable identity card data structure 600. Alternatively, the usage data 620 is referenced in the portable identity card data structure 600. As an example, the portable identity card data structure 600 includes a pointer to (or an identifier of) the usage data 620.

The usage data 620 includes any historical information about how the verifiable credential is being used. As examples, the usage data includes frequency with which the verifiable credential is exposed to relying party computing systems, an identity of a relying party computing system to which the verifiable credential was last exposed, a time that the verifiable credential was last exposed, a device that was used to present the verifiable credential, and so forth.

The verifiable credential 610 is stored on the holder computing system, such as the holder 220 of FIG. 2. Alternatively, the verifiable credential 610 is stored in a way to be accessible by multiple different holder computing systems, each under the control of the same holder. As examples, the verifiable credential 610 can be stored in a centralized location, or in a decentralized distributed ledger, such as in a decentralized identifier (DID) document. As described below with respect to FIG. 9, content of a DID document is accessible by using a decentralized identifier (DID). Thus, in this embodiment, the holder computing system accesses the verifiable credential 610 from whatever holder computing system is in the control of the holder, by using the DID of the holder.

The portable identity card data structure 600 is stored on the holder computing system, such as the holder 220 of FIG. 2. Alternatively, the portable identity card data structure 600 is stored in a way to be accessible by multiple different holder computing systems, each under the control of the same holder. As examples, the portable identity card data structure 600 can be stored in a centralized location, or in a decentralized distributed ledger, such as in a decentralized identifier (DID) document. Thus, in this embodiment, the holder computing system accesses the portable identity card data structure 600 from whatever holder computing system is in the control of the holder, by using the DID of the holder.

Thus, the portable identity card data structure 600, along with the associated verifiable credential 610 and the usage data 620 for that verifiable credential, are available on different computing systems or devices of the holder. Accordingly, the holder may present the portable identity card from a variety of different devices, and also keep track of usage of the verifiable credential despite the verifiable credential being presented from various systems or devices in control of the holder. The holder may also present verifiable credentials from outside of any given sphere of trust (e.g., outside of a corporate network), since the portable identity card can be securely accessed by any of the holder's devices.

An example use scenario for a portable identity card will now be described with respect to the user interfaces of FIGS. 7A through 10C. In this particular use scenario, an issuer is a fictional baseball league called the Contoso Baseball League (or simply "Contoso"), who is to issue a verifiable credential to players in that baseball league. Also, the holder is a player (called John Doe in the example) of the Contoso Baseball League. The verifiers are various partners (called Partner A, Partner B, and so forth) that provide benefits to players of the Contoso Baseball League.

In FIGS. 7A through 7F, the issuer creates a portable identity card template, which is used to create a portable identity card for each player who authenticates to the issuer and requests their respective portable identity card.

Figure 7A:
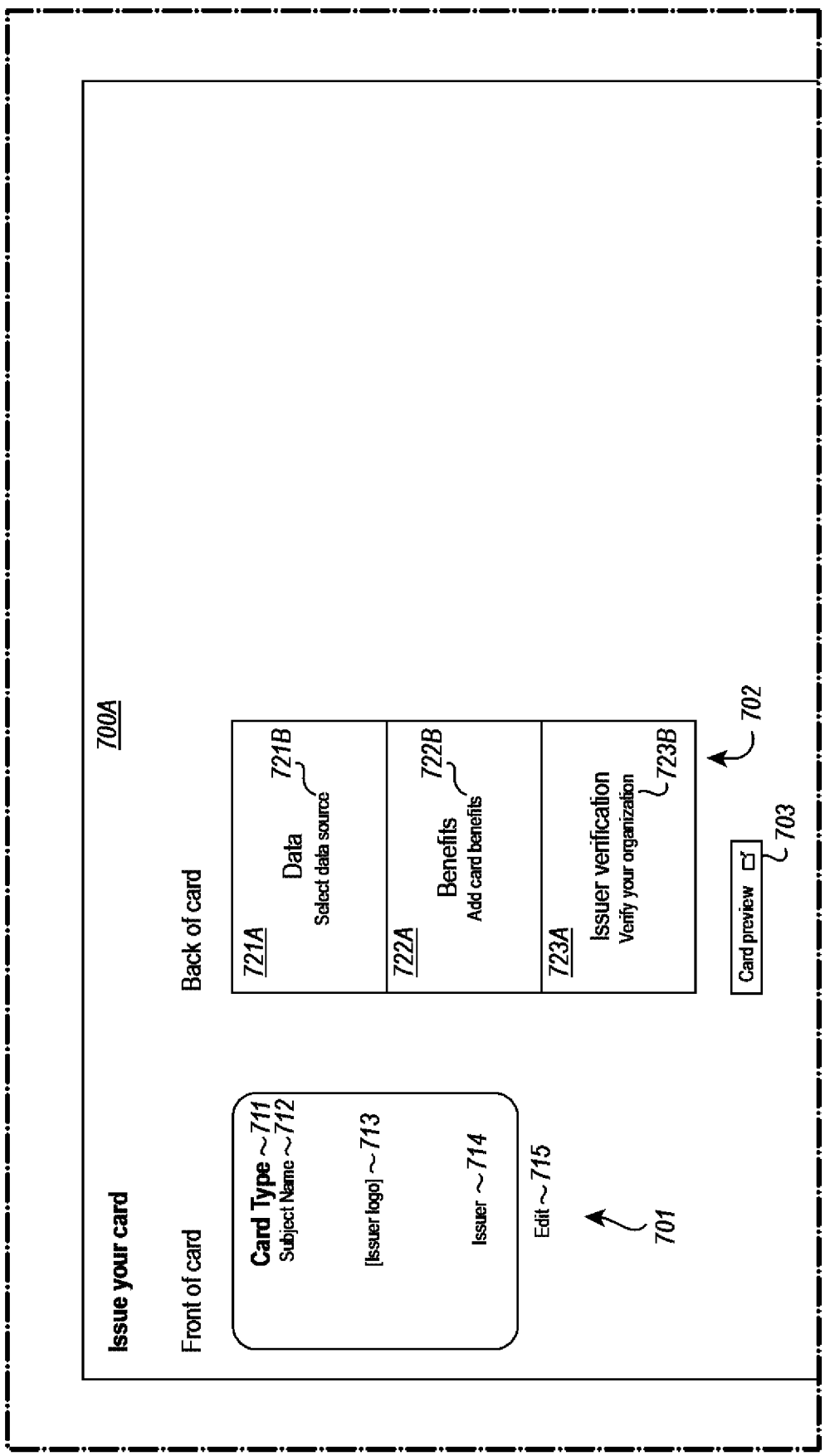

In FIG. 7A, the issuer computing system presents the issuer with a user interface 700A that allows the issuer to begin the process of creating a portable identity card template. The initial user interface 700A displays a card front region 701 that the issuer will interface with to populate the front of the portable identity card template, a card back region 702 that the issuer will interface with to populate the back of the portable identity card template, and a card preview control 703 that the issuer interfaces with to see a preview of the portable identity card template to date.

The card front region 701 includes a card type area 711 that will display the type of portable identity card template. The card front region 701 also includes a subject name area 712 that will display the subject about which the issuer will make claims on the portable identity card. In this example, the subject name will be the player's name, and will remain unpopulated in the portable identity card template. The subject name will only become populated in the respective portable identity card when the player authenticates to the issuer, and requests their respective portable identity card. The card front region 701 also includes an issuer logo area 713 that will display a logo of the issuer, and an issuer identity region 714 that will display an identity of the issuer. The front of card region 701 also includes an edit control 715 that the issuer will select to begin populating the areas 711, 713 and 714 of the front of the portable identity card template.

The card back region 702 includes a data source region 721A that will represent the source of data from which data will be drawn to create the portable identity card from the portable identity card template. The issuer initiates selection of the data source by first activating the select data source control 721B. The card back region 702 also includes a benefits region 722A that will show any card benefits the holder will have. The issuer initiates identification of these benefits by first activating the add card benefits control 722B. The card back region 702 also includes an issuer verification region 723A that the issuer interfaces with in order to authenticate the identity of the issuer by first activating the verify your organization control 723B.

Figure 7B:
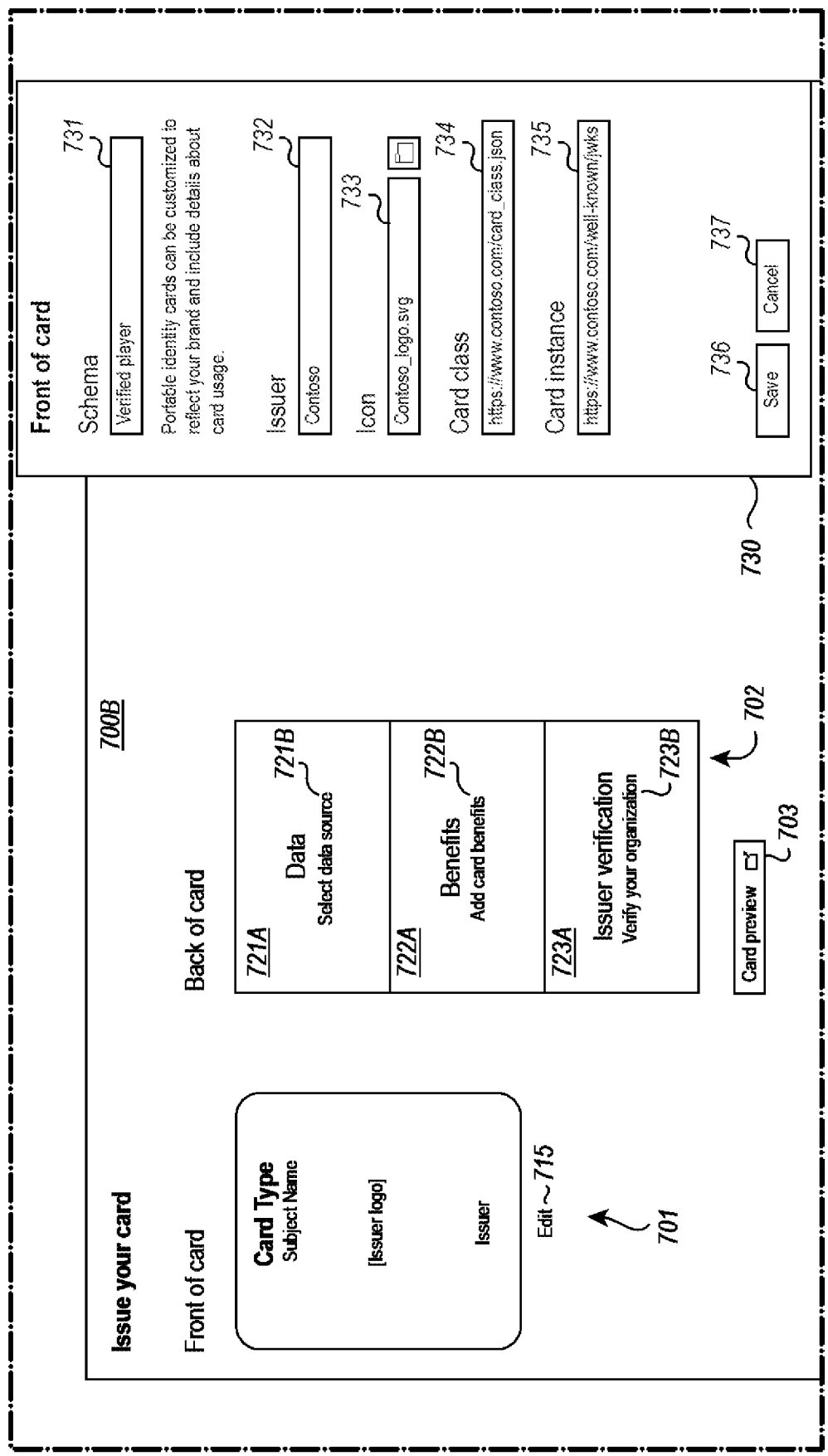

FIG. 7B shows a user interface 700B that appears after the issuer selects the edit control 715 to thereby show a card front detail window 730. To emphasize that the issuer is entering information from the front of the card, the front of card region 701 is highlighted. In this card front detail window 730, the issuer enters a schema (or type) of the portable identity card (in this case Verified player) in the schema input field 731, a name of the issuer in the issuer name field 732, a file name identifying a logo file for the issuer in the icon field 733, a card class in the card class field 734, and a card instance in the card instance field 735. The issuer saves this information and closes the card front detail window 730 by selecting the save control 736. Alternatively, the issuer discards the entered information and closes the card front detail window 730 by selecting the cancel control 737.

Figure 7C:
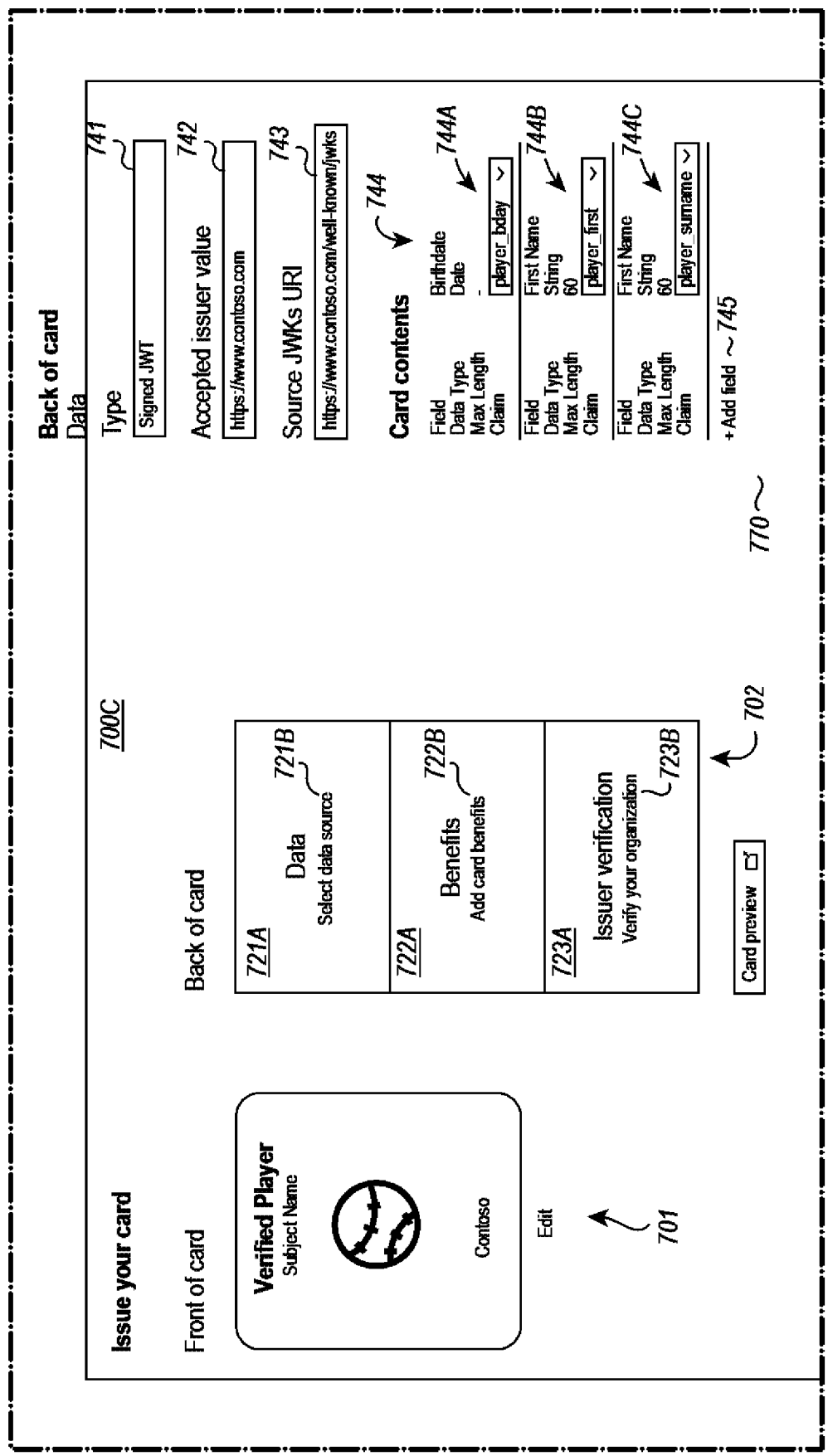

FIG. 7C illustrates a user interface 700C that appears when the issuer selects the save control 736 of FIG. 7B, and thereafter activates the select data source control 721B. The selection of the save control 736 causes the card front region 701 to now be populated with the card type "Verified Player", the issuer logo (here, a logo of the fictional baseball league Contoso), and the issuer name of "Contoso". At this stage, the subject name remains unpopulated because this portable identity card template is to be used to create multiple portable identity cards for multiple subjects (baseball players in this example). The selection of the select data source control 721B opens a card back data window 740. To emphasize that the issuer is now working on identifying the data source to be used to populate portable identity cards, the data source region 721A is highlighted.

In the card back data window 740, the issuer has entered the type of data source (here, JWT or JSON Web Token) in drop down field 741, the accepted issuer value in accepted issuer value field 742, and the source JSON Web Token uniform resource identifier in the source JWKs URI field 743. The accepted issuer value is the source that the issuer accepts as being accurate data for making claims. Later, when a player requests a portable identity card, the data source will be used to populate the claims that the issuer identifies in the card contents field 744. Thus, the verifiable credential for the player will include those claims identified in the card contents field 744.

In this example, the issuer specified in field 744A that the credential is to include a claim of type player_bday (a player birthday as selected from a drop down menu of various claim types) from the Birthdate field having data type Date of the selected data source. Additionally, the issuer specified in field 744B that the credential is to include a claim of type player_first (a player first name as selected from the drop down menu) from the First Name field having data type String of maximum length 60. The issuer specified in field 744C that the credential is to include a claim of type player_last (a player last name from the drop down menu) from the Last Name field also of type string having a maximum length of 60. If the credential is to include further claims, the user may select the add field control 745. Thus, the fields 744 represent which data will be extracted and what form the data will take when claims are actually generated at the time each respective portable identity card is created from the portable identity card template.

Figure 7D:
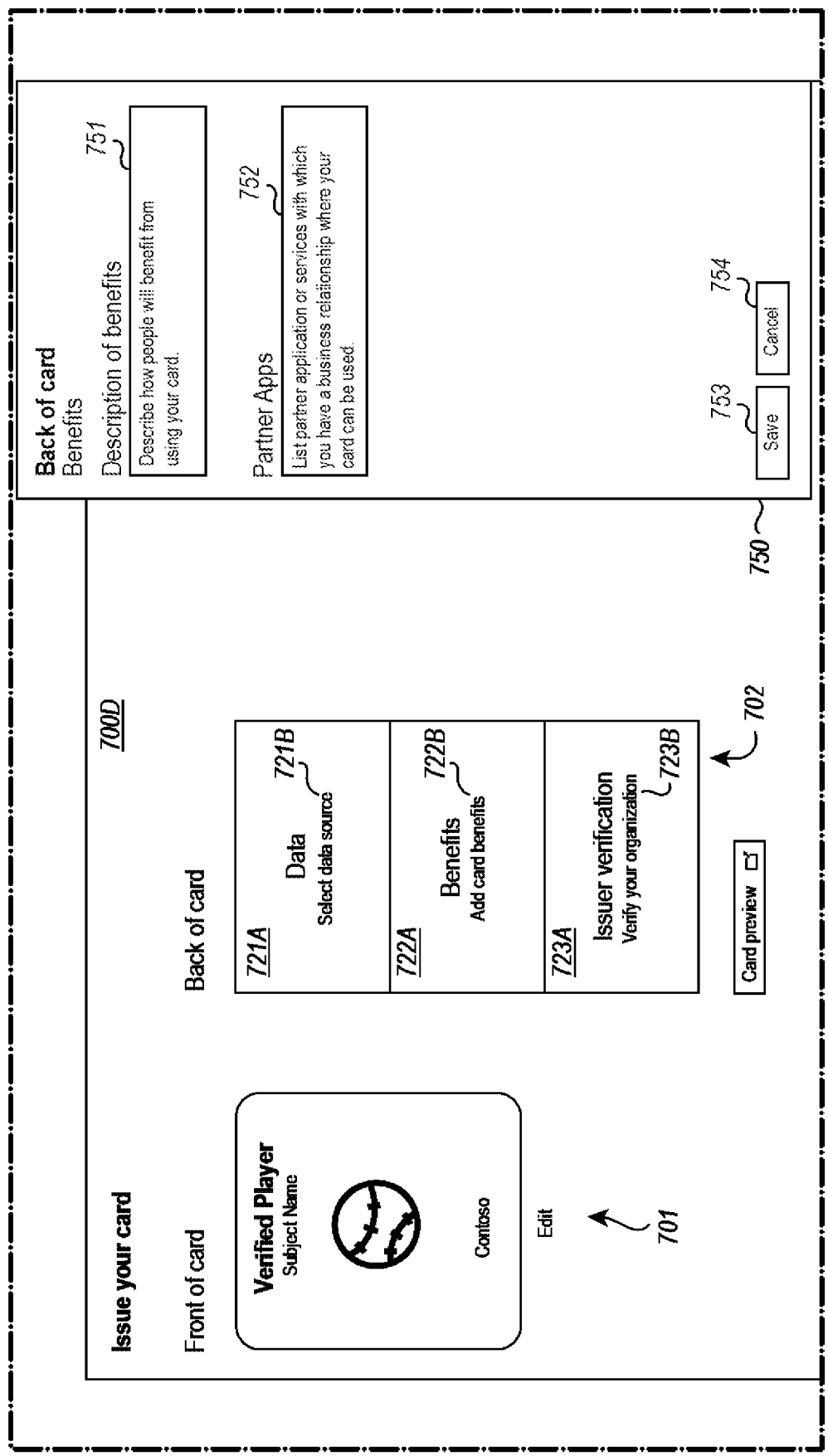

The user interface 700D of FIG. 7D is shown when the has selected the add card benefits control 722B in the benefits region 722A of the card back region 702. This causes the information from the card back data window 740 to be saved as the data source and claims that are to be used to generate subsequent portable identity cards from the portable identity card template. The completion of entry of the data source is now represented by a check mark in the data source region 721A, and the other highlighting is now removed from the data source region 721A.

The selection of the add card benefits control 722B also causes the benefits region 722A to be highlighted, and the card back benefits window 750 to appear. Here, the issuer identifies a human-readable description of the benefits in the field 751, and also identifies partner apps (for partners or services where the portable identity cards can be used by the respective holders) in the partner apps field 752. The issuer may then select the save control 753 to save these benefits to the portable identity card template or the cancel control 754 to cancel entry of these benefits without saving them to the portable identity card template. Suppose in our example that the issuer has saved the benefits using the save control 753.

Figure 7E:
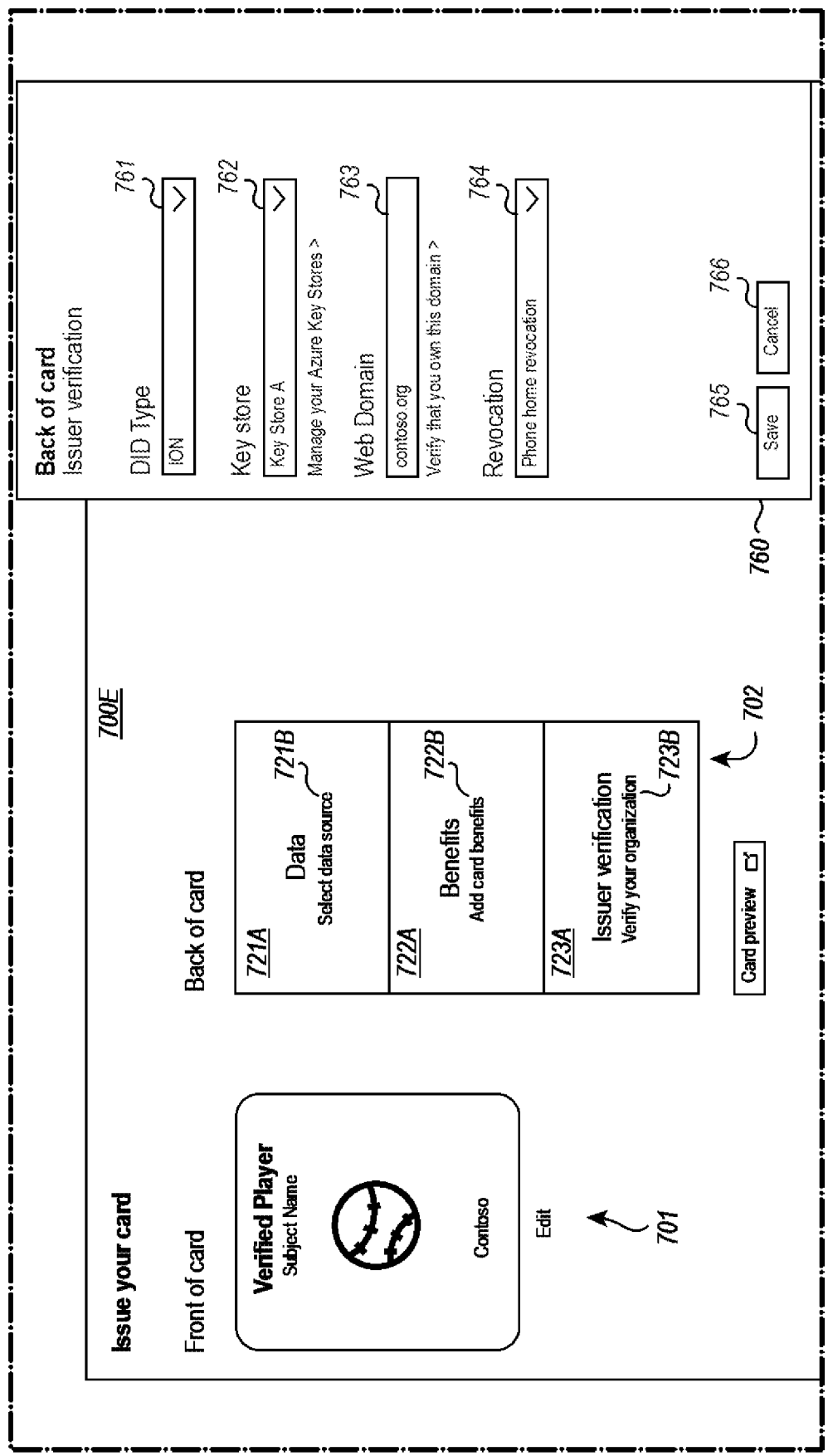

In the user interface 700E of FIG. 7E, the issuer has now selected the verify your organization control 723B in the issuer verification region 723A of the card back region 702. This causes the issuer verification region 723A to be highlighted, and causes the card back issuer verification window 760 to appear. The completion of the entry of benefits information in the benefits region 722A is also represented by the benefits region 722A containing a check mark. The issuer then entered a decentralized identity (DID) type called ION from the drop down field 761, a key store identity (herein, "Key Store A") in the key store drop down field 762, a web domain for the issuer in the web domain field 763, and a revocation method for revoking the verifiable credential in the revocation drop down field 764. The issuer then selects the save control 765 to save these issuer verification details, or the cancel control 766 to cancel entry of these benefits without saving them to the portable identity card.

Suppose in our example that the issuer has saved the verification details using the save control 765. FIG. 7F shows a resulting interface 700F that now shows all details windows being closed, and showing the issuer verification field with a check mark. The issuer computing system responds by creating a portable identity card template data structure, which is now ready to be used to create portable identity cards for individual holders (e.g., players) after they authenticate to the issuer.

Figure 8A:
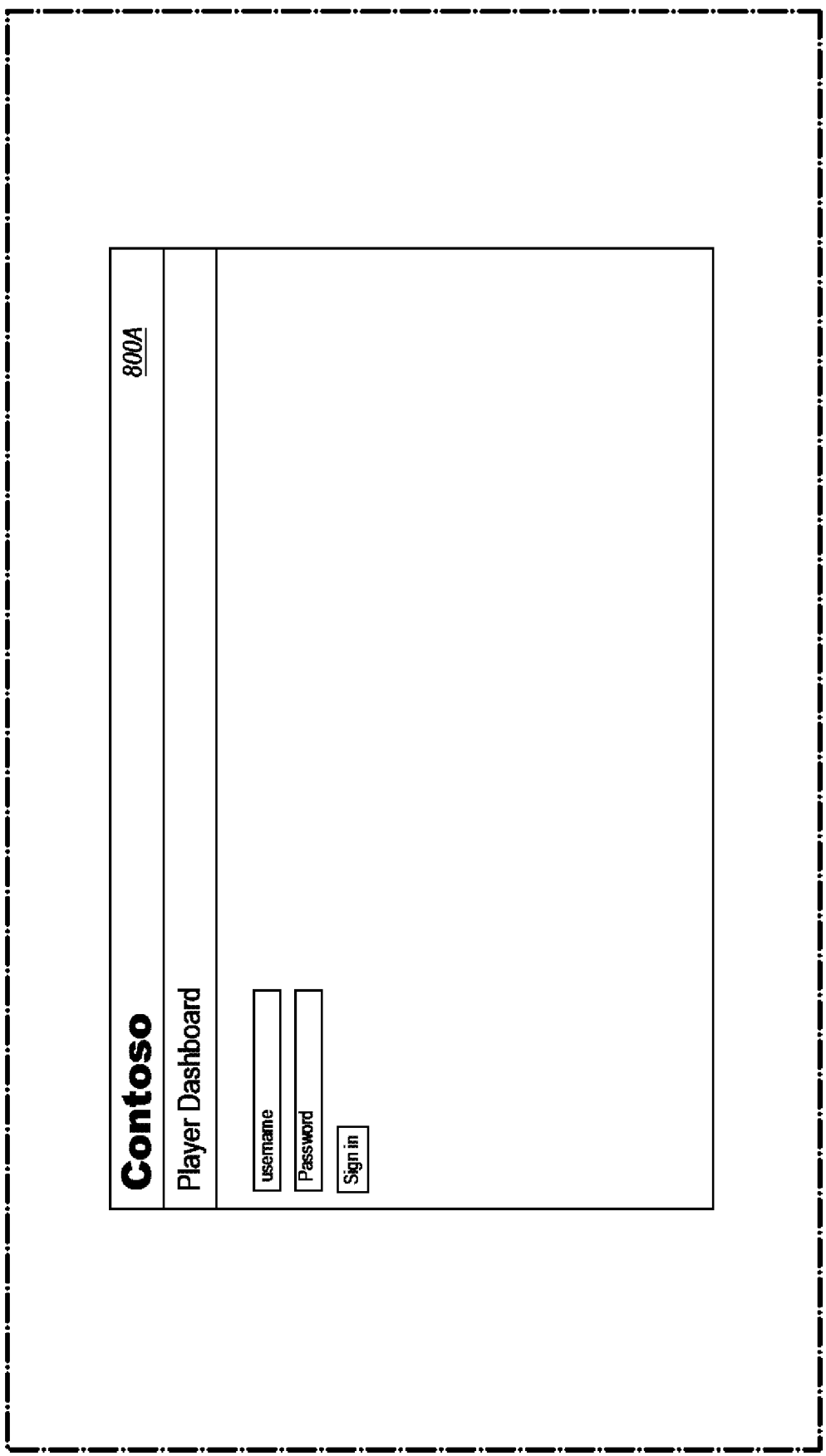

An example holder user experience will now be described with respect to the user interfaces of FIGS. 8A through 8F. FIG. 8A illustrates a user interface 800A in which the holder (in this case a Contoso Baseball League player) signs into a player dashboard offered by the issuer (in this case the Contoso Baseball League).

Figure 8B:
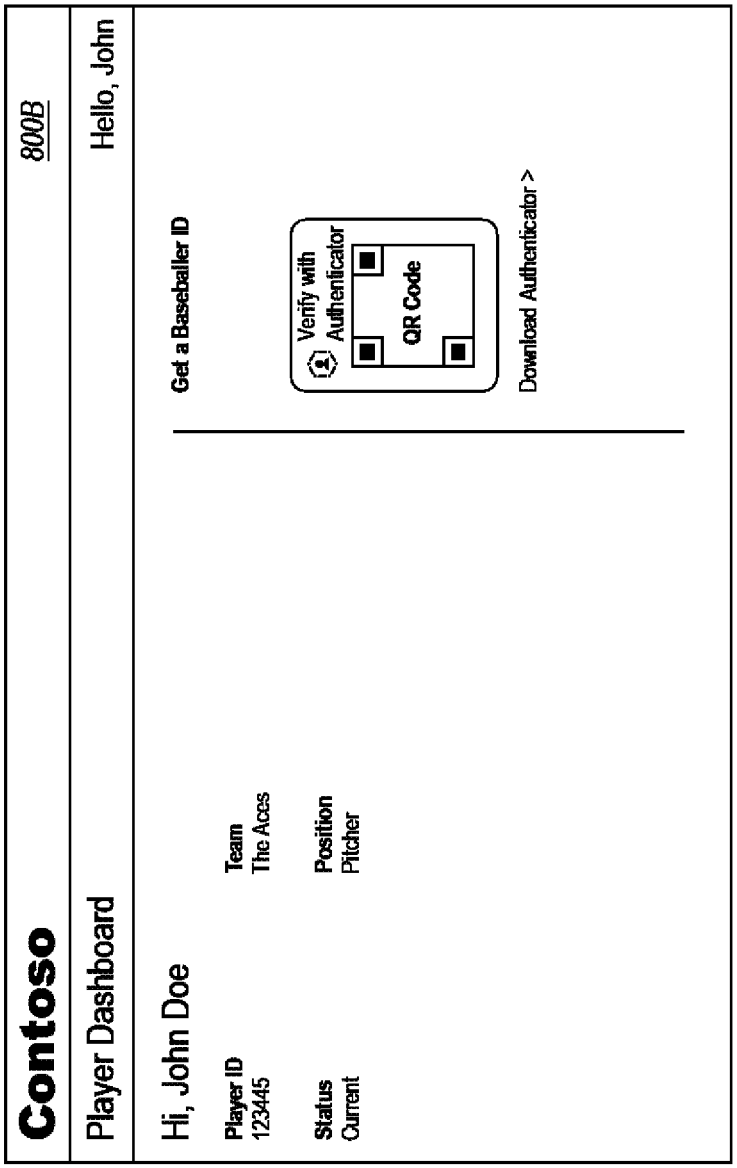

FIG. 8B illustrates an interface 800B displayed to the player after authentication is completed. Here, basic information about the player (name, player ID, team, status, position) is displayed, along with a QR code that allows the player to download a further authenticator. In this fictional example, the name of the Contoso Baseball League player that signed into the issuer portal is "John Doe".

Figure 8C:
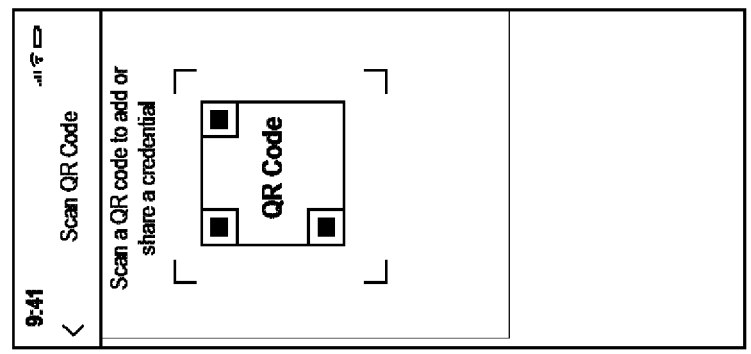
Figure 8C:
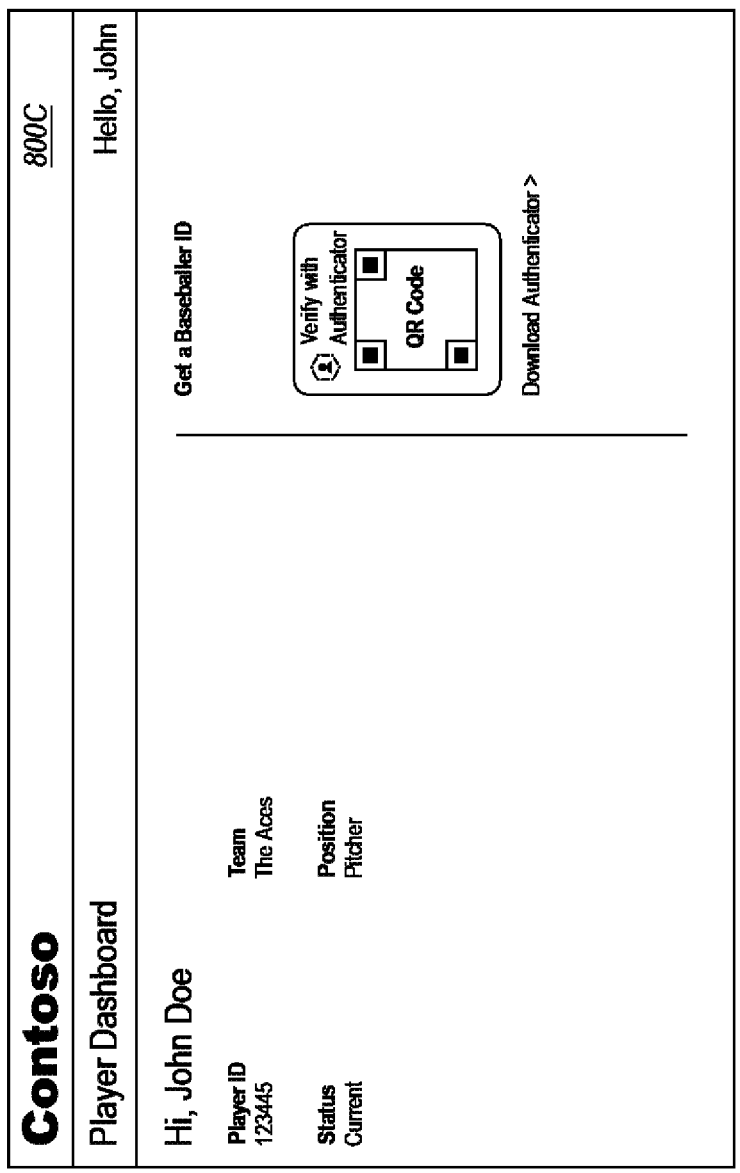
Figure 8D:
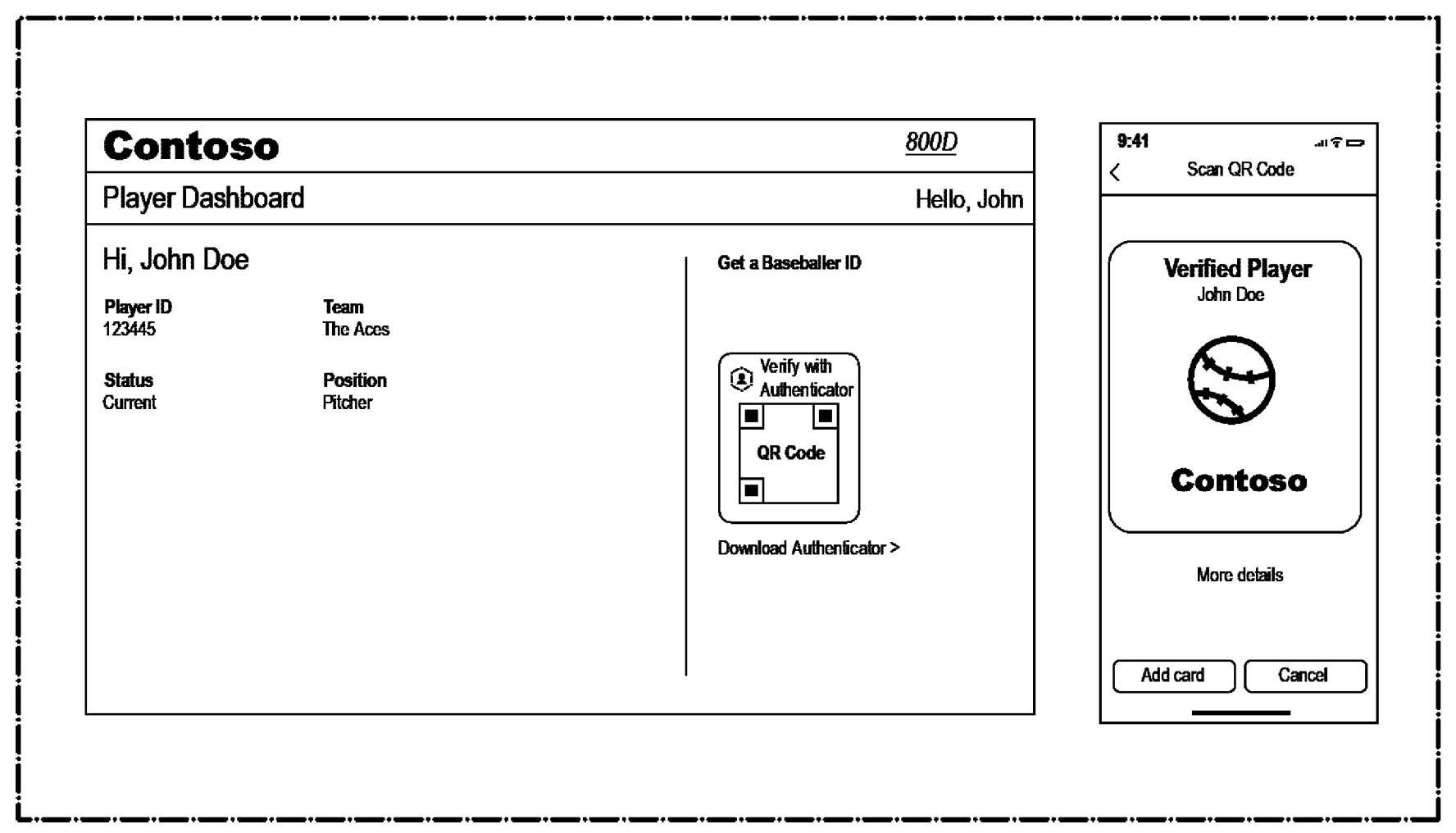
Figure 8E:
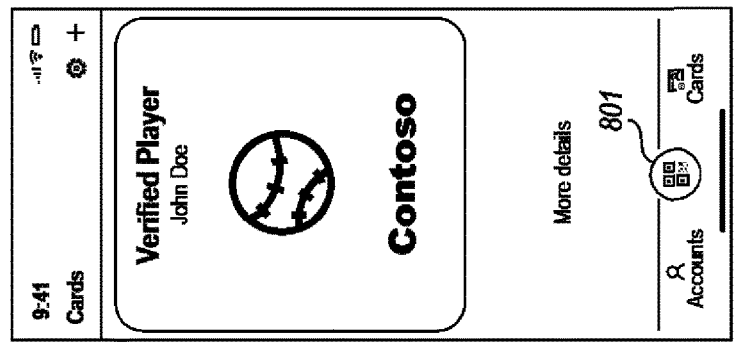
Figure 8F:

In the user interface 800C of FIG. 8C, the player (John Doe) is given an option to scan a QR code in order to add or share (i.e., present) a credential. Recall that there is a portable identity card template that has been created in FIGS. 7A through 7F precisely for creating portable identity cards for Contoso baseball players such as John Doe. Accordingly, when the player scans the QR code of FIG. 8C, the portable identity card template is used to create a portable identity card data structure using John Doe's information. This includes creating the verifiable credential with the designated claims about John Doe. In addition, as represented by the user interface 800D of FIG. 8D, John Doe is presented with a visualization of the front of the portable identity card now populated with John Doe's name.

Suppose that John Doe selects that "Add card" control in the user interface 800D of FIG. 8D. The verified player portable identity card is then added to John Doe's available portable identity cards. Furthermore, player John Doe can now interface with the portable identity card as illustrated in the user interface 800E of FIG. 8E. As an example, the user selects control 801 to see details of the card, as illustrated in the user interface 800F of FIG. 8F. The player can see their name, baseball player ID, their status, the partners that the player can present their portable identity card to, and issuer identification. The player may now present the portable identity card to any of the identified partners.

Figure 9A:
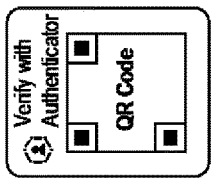
FIGS. 9A through 9C illustrate a sequence of user interfaces in which a holder presents the portable identity card to a relying party.
Figure 9B:
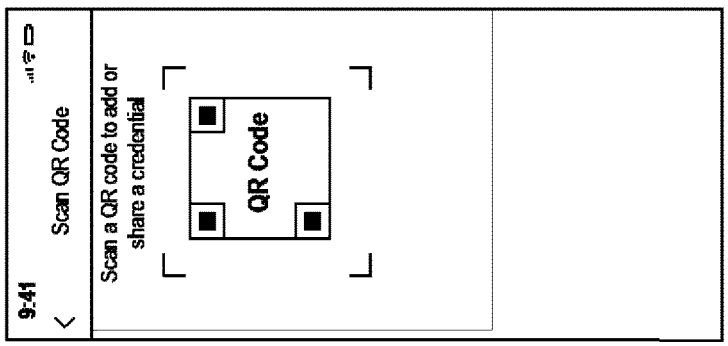
Figure 9B:
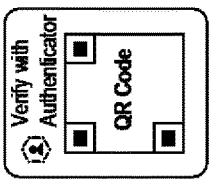
Figure 9C:
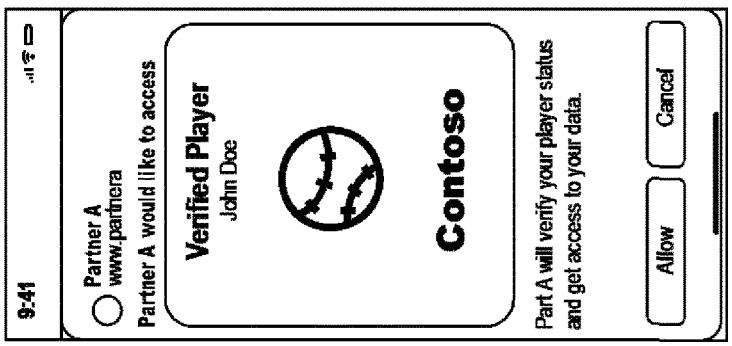
Figure 9C:
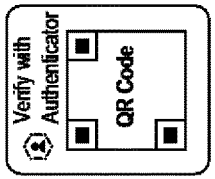

In the example of FIGS. 9A through 9C, the player presents the portable identity card to a verifier (or relying party), which is one of the partners listed in the portable identity card. The user interface 900A of FIG. 9A is presented to John Doe when John Doe selected Partner A from his portable identity card displayed in the user interface 800E of FIG. 8E. Player John Doe scans the QR code, resulting in user interface 900B of FIG. 9B. John Doe may then cause the QR code to be presented to a computing system of Partner A. John Doe is then presented with the user interface 900C or FIG. 9C, in which the user selects the "Allow" control to present the verifiable credential (or an associated verifiable presentation) associated with the portable identity card with Partner A. When the verifiable credential is presented to Partner A, the computing system of Partner A follows the proof instruction (which may include contacting the issuer computing system, or the registry computing system) to verify the verifiable credential.

This process may repeat for John Doe many times for many different issuers. As an example, Partner A may be a relying party, but may also itself be an issuer. Accordingly, in addition to presenting verifiable claims to Partner A, Partner A may provide John Doe with another portable identity card.

Figure 10A:
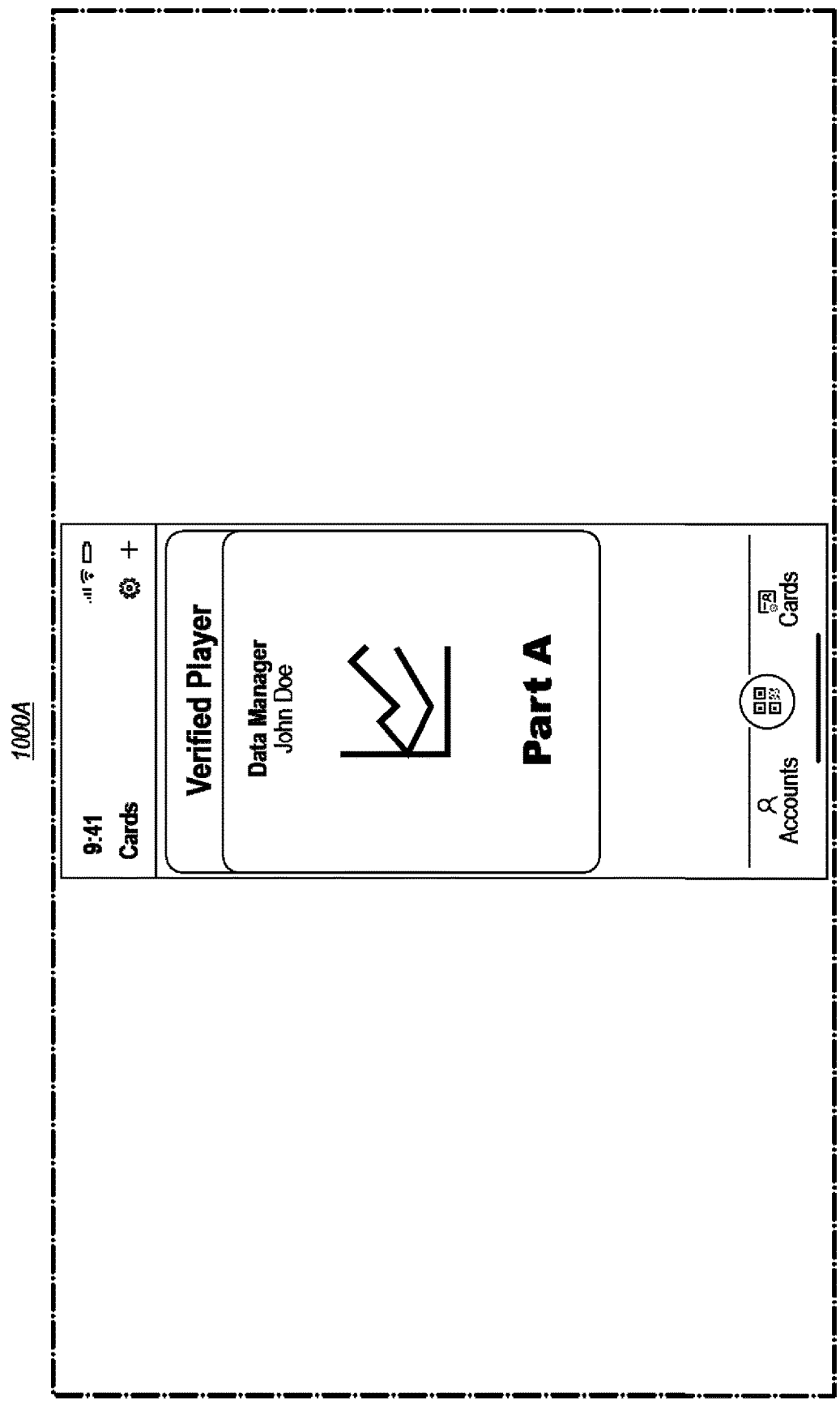
Figure 10C:
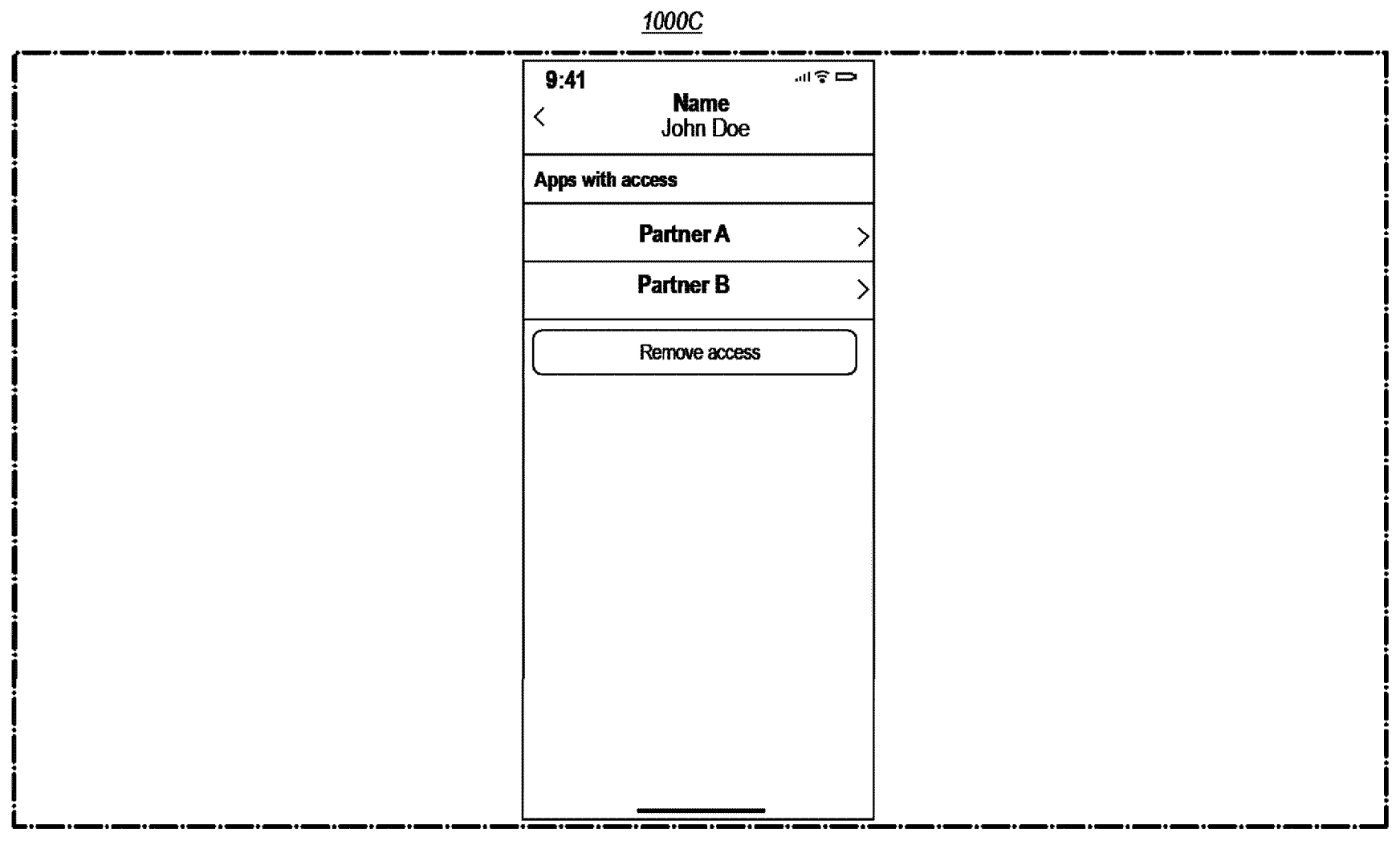

FIG. 10A illustrates a user interface 1000A that shows John Doe a stack of now two portable identity cards—the Verified player portable identity card provided by the Contoso Baseball League, as well as a Data Manager portable identity card provided by Partner A. Suppose that the user interfaces with the Player portable identity card to view transaction history associated with the verifiable credential of that portable identity card. The user interface 1000B of FIG. 10B is then displayed to John Doe showing several transactions of that card with the Data Manager application of Partner A. FIG. 10C illustrates a user interface 1000C that allows John Doe to view which Partners have been granted access to the Verified player portable identity card, and to potentially revoke access.

The principles described herein may be performed in a decentralized context. As an example, the holder computing system can be a digital wallet, such as the DID management module 1220 described below with respect to FIG. 12. Alternatively, or in addition, the subject of the claims, and the issuer identifier, can be decentralized identifiers (DIDs). Alternatively, or in addition, the portable identity card data structure (or portions thereof) may be stored in a DID document. This would be especially helpful as the portable identity card would then be accessible by the holder from any device associated with the holder's DID. Accordingly, decentralized identifiers will first be described with respect to FIGS. 11 and 12.

Figure 11:
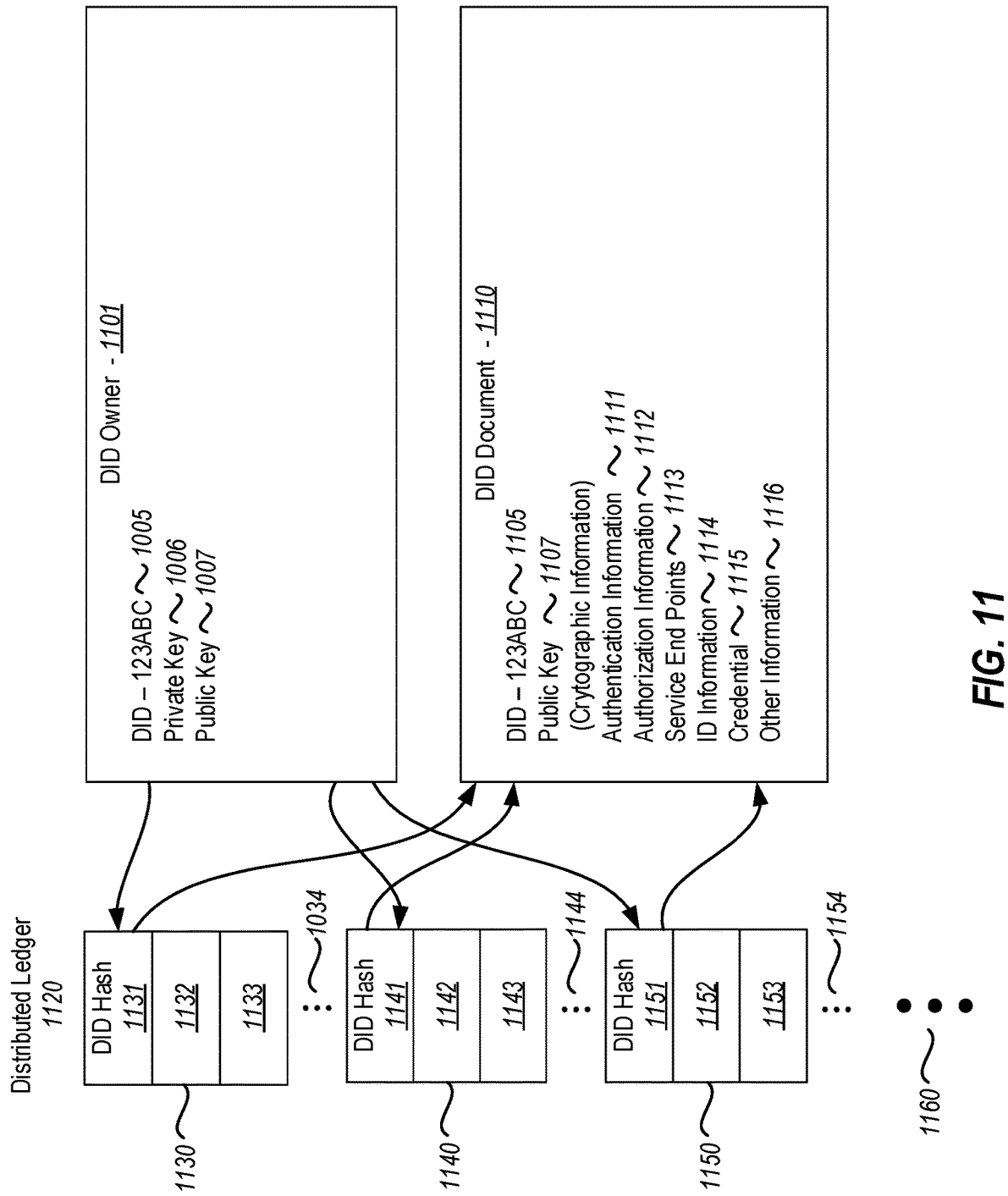
FIG. 11 illustrates an example environment for creating a decentralized identification (DID)

As illustrated in FIG. 11, a DID owner 1101 may own or control a DID 1105 that represents a digital identity of the DID owner 1101. The DID 1105 is a digital identity that correlates with (i.e., identifies) the DID owner 1101 across different digital contexts. The DID owner 1101 may register a DID using a creation and registration service, which will be explained in more detail below.

The DID owner 1101 may be any entity that could benefit from a digital identity. For example, the DID owner 1101 may be a human being or an organization of human beings. Such organizations might include a company, department, government, agency, or any other organization or group of organizations. Each individual human being might have a DID while the organization(s) to which each belongs might likewise have a DID.

The DID owner 1101 may alternatively be a machine, system, or device, or a collection of machine(s), device(s) and/or system(s). In still other embodiments, the DID owner 1101 may be a subpart of a machine, system or device. For instance, a device could be a printed circuit board, where the subpart of that circuit board are individual components of the circuit board. In such embodiments, the machine or device may have a DID and each subpart may also have a DID. A DID owner might also be a software component such as the executable component 1306 described above with respect to FIG. 13. An example of a complex executable component 1306 might be an artificial intelligence. Accordingly, an artificial intelligence may also own a DID.

Thus, the DID owner 1101 may be any entity, human or non-human, that is capable of creating the DID 1105 or at least having the DID 1105 created for and/or associated with them. Although the DID owner 1101 is shown as having a single DID 1105, this need not be the case as there may be any number of DIDs associated with the DID owner 1101 as circumstances warrant.

As mentioned, the DID owner 1101 may create and register the DID 1105. The DID 1105 may be any identifier that may be associated with the DID owner 1101. Preferably, that identifier is unique to that DID owner 1101, at least within a scope in which the DID is anticipated to be in use. As an example, the identifier may be a locally unique identifier, and perhaps more desirably a globally unique identifier for identity systems anticipated to operate globally. In some embodiments, the DID 1105 may be a Uniform Resource identifier (URI) (such as a Uniform Resource Locator (URL)) or other pointer that relates the DID owner 1101 to mechanisms to engage in trustable interactions with the DID owner 1101.

The DID 1105 is "decentralized" because it does not require a centralized, third party management system for generation, management, or use. Accordingly, the DID 1105 remains under the control of the DID owner 1101. This is different from conventional centralized IDs which base trust on centralized authorities and that remain under control of corporate directory services, certificate authorities, domain name registries, or other centralized authority (referred to collectively as "centralized authorities" herein). Accordingly, the DID 1105 may be any identifier that is under the control of the DID owner 1101 and that is independent of any centralized authority.

In some embodiments, the structure of the DID 1105 may be as simple as a user name or some other human-understandable term. However, in other embodiments, for increased security, the DID 1105 may preferably be a random string of numbers and letters. In one embodiment, the DID 1105 may be a string of 128 numbers and letters. Accordingly, the embodiments disclosed herein are not dependent on any specific implementation of the DID 1105. In a very simple example, the DID 1105 is shown within the figures as "123ABC".

As also shown in FIG. 11, the DID owner 1101 has control of a private key 1106 and public key 1107 pair that is associated with the DID 1105. Because the DID 1105 is independent of any centralized authority, the private key 1106 should at all times be fully in control of the DID owner 1101. That is, the private and public keys should be generated in a decentralized manner that ensures that they remain under the control of the DID owner 1101.

As will be described in more detail to follow, the private key 1106 and public key 1107 pair may be generated on a device controlled by the DID owner 1101. The private key 1106 and public key 1107 pair should not be generated on a server controlled by any centralized authority as this may cause the private key 1106 and public key 1107 pair to not be fully under the control of the DID owner 1101 at all times. Although FIG. 11 and this description have described a private and public key pair, it will also be noted that other types of reasonable cryptographic information and/or mechanisms may also be used as circumstances warrant.

FIG. 11 also illustrates a DID document 1110 that is associated with the DID 1105. As will be explained in more detail to follow, the DID document 1110 may be generated at the time that the DID 1105 is created. In its simplest form, the DID document 1110 describes how to use the DID 1105. Accordingly, the DID document 1110 includes a reference to the DID 1105, which is the DID that is described by the DID document 1110. In some embodiments, the DID document 1110 may be implemented according to methods specified by a distributed ledger 1120 (such as blockchain) that will be used to store a representation of the DID 1105 as will be explained in more detail to follow. Thus, the DID document 1110 may have different methods depending on the specific distributed ledger.

The DID document 1110 also includes the public key 1107 created by the DID owner 1101 or some other equivalent cryptographic information. The public key 1107 may be used by third party entities that are given permission by the DID owner 1101 to access information and data owned by the DID owner 1101. The public key 1107 may also be used to verify that the DID owner 1101 in fact owns or controls the DID 1105.

The DID document 1110 may also include authentication information 1111. The authentication information 1111 specifies one or more mechanisms by which the DID owner 1101 is able to prove that the DID owner 1101 owns the DID 1105. In other words, the mechanisms of the authentication information 1111 shows proof of a binding between the DID 1105 (and thus its DID owner 1101) and the DID document 1110. In one embodiment, the authentication information 1111 specifies that the public key 1107 be used in a signature operation to prove the ownership of the DID 1105. Alternatively, or in addition, the authentication information 1111 specifies that the public key 1107 be used in a biometric operation to prove ownership of the DID 1105. Accordingly, the authentication information 1111 includes any number of mechanisms by which the DID owner 1101 is able to prove that the DID owner 1101 owns the DID 1105.

The DID document 1110 may also include authorization information 1112. The authorization information 1112 allows the DID owner 1101 to authorize third party entities the rights to modify the DID document 1110 or some part of the document without giving the third party the right to prove ownership of the DID 1105. In one example, the authorization information 1112 allows the third party to update any designated set of one or more fields in the DID document 1110 using any designated update mechanism. Alternatively, the authorization information allows the third party to limit the usages of DID 1105 by the DID owner 1101 for a specified time period. This may be useful when the DID owner 1101 is a minor child and the third party is a parent or guardian of the child. The authorization information 1112 may allow the parent or guardian to limit use of the DID owner 1101 until such time as the child is no longer a minor.

The authorization information 1112 also specifies one or more mechanisms that the third party will need to follow to prove they are authorized to modify the DID document 1110. In some embodiments, these mechanisms may be similar to those discussed previously with respect to the authentication information 1111.

The DID document 1110 also includes one or more service endpoints 1113. A service endpoint includes a network address at which a service operates on behalf of the DID owner 1101. Examples of specific services include discovery services, social networks, file storage services such as identity servers or hubs, and verifiable claim repository services. Accordingly, the service endpoints 1113 operate as pointers for the services that operate on behalf of the DID owner 1101. These pointers may be used by the DID owner 1101 or by third party entities to access the services that operate on behalf of the DID owner 1101. Specific examples of service endpoints 1113 will be explained in more detail to follow.

The DID document 1110 further includes identification information 1114. The identification information 1114 includes personally identifiable information such as the name, address, occupation, family members, age, hobbies, interests, or the like of DID owner 1101. Accordingly, the identification information 1114 listed in the DID document 1110 represents a different persona of the DID owner 1101 for different purposes.

A persona may be pseudo anonymous. As an example, the DID owner 1101 may include a pen name in the DID document when identifying him or her as a writer posting articles on a blog. A persona may be fully anonymous. As an example, the DID owner 1101 may only want to disclose his or her job title or other background data (e.g., a school teacher, an FBI agent, an adult older than 21 years old, etc.) but not his or her name in the DID document. As yet another example, a persona may be specific to who the DID owner 1101 is as an individual. As an example, the DID owner 1101 may include information identifying him or her as a volunteer for a particular charity organization, an employee of a particular corporation, an award winner of a particular award, and so forth.

The DID document 1110 also includes credential information 1115, which may also be referred to herein as an attestation. The credential information 1115 may be any information that is associated with the DID owner 1101's background. For instance, the credential information 1115 may be (but is not limited to) a qualification, an achievement, a government ID, a government right such as a passport or a driver's license, a payment provider or bank account, a university degree or other educational history, employment status and history, or any other information about the DID owner 1101's background.

The DID document 1110 also includes various other information 1116. In some embodiments, the other information 1116 may include metadata specifying when the DID document 1110 was created and/or when it was last modified. In other embodiments, the other information 1116 may include cryptographic proofs of the integrity of the DID document 1110. In still further embodiments, the other information 1116 may include additional information that is either specified by the specific method implementing the DID document or desired by the DID owner 1101.

FIG. 11 also illustrates a distributed ledger 1120. The distributed ledger 1120 can be any decentralized, distributed network that includes various computing systems that are in communication with each other. In one example, the distributed ledger 1120 includes a first distributed computing system 1130, a second distributed computing system 1140, a third distributed computing system 1150, and any number of additional distributed computing systems as represented by the ellipses 1160. The distributed ledger 1120 operates according to any known standards or methods for distributed ledgers. Examples of conventional distributed ledgers that correspond to the distributed ledger 1120 include, but are not limited to, Bitcoin [BTC], Ethereum, and Litecoin.

In the context of DID 1105, the distributed ledger or blockchain 1120 is used to store a representation of the DID 1105 that points to the DID document 1110. In some embodiments, the DID document 1110 may be stored on the actual distributed ledger. Alternatively, in other embodiments the DID document 1110 may be stored in a data storage (not illustrated) that is associated with the distributed ledger 1120.

A representation of the DID 1105 is stored on each distributed computing system of the distributed ledger 1120. For example, in FIG. 11 this is shown as DID hash 1131, DID hash 1141, and DID hash 1151, which are ideally identical hashed copies of the same DID. The DID hash 1131, DID hash 1141, and DID hash 1151 point to the location of the DID document 1110. The distributed ledger or blockchain 1120 may also store numerous other representations of other DIDs as illustrated by references 1132, 1133, 1134, 1142, 1143, 1144, 1152, 1153, and 1154.

In one embodiment, when the DID owner 1101 creates the DID 1105 and the associated DID document 1110, the DID hash 1131, DID hash 1141, and DID hash 1151 are written to the distributed ledger 1120. The distributed ledger 1120 thus records that the DID 1105 now exists. Since the distributed ledger 1120 is decentralized, the DID 1105 is not under the control of any entity outside of the DID owner 1101. DID hash 1131, DID hash 1141, and DID hash 1151 may each include, in addition to the pointer to the DID document 1110, a record or time stamp that specifies when the DID 1105 was created. At a later date, when modifications are made to the DID document 1110, each modification (and potentially also a timestamp of the modification) is also be recorded in DID hash 1131, DID hash 1141, and DID hash 1151. DID hash 1131, DID hash 1141, and DID hash 1151 could further include a copy of the public key 1107 so that the DID 1105 is cryptographically bound to the DID document 1110.

Figure 12:
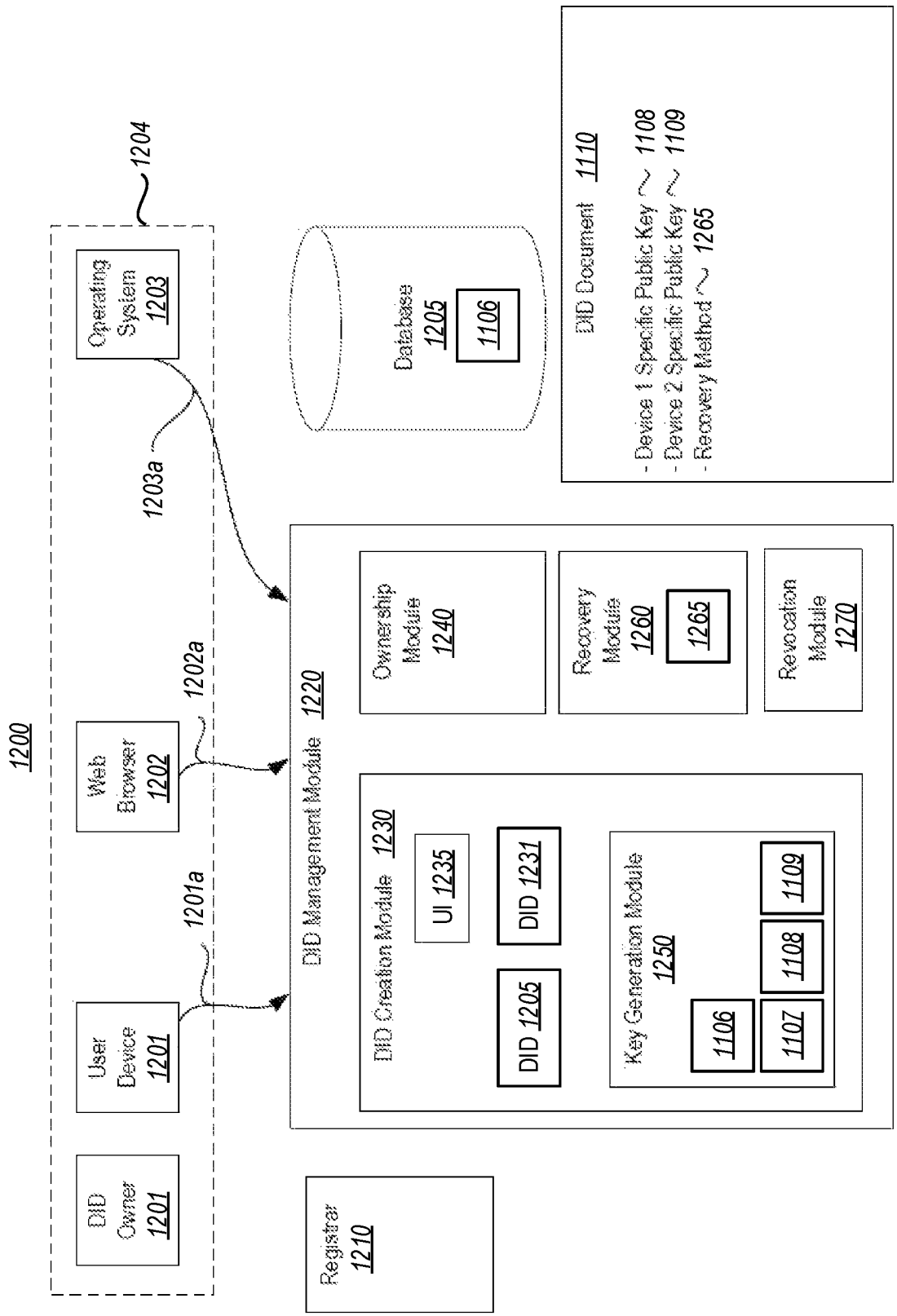
FIG. 12 illustrates an example environment for various DID management operations and services.

Having described DIDs and how they operate generally with reference to FIG. 11, specific embodiments of DID environments will now be explained with respect to FIG. 12. FIG. 12 illustrates an example environment 1200 that may be used to perform various DID management operations and services will now be explained. It will be appreciated that the environment of FIG. 12 may reference elements from FIG. 11 as needed for ease of explanation.

As shown in FIG. 12, the environment 1200 includes various devices and computing systems that are owned or otherwise under the control of the DID owner 1101. These may include a user device 1201. The user device 1201 may be, but is not limited to, a mobile device such as a smart phone, a computing device such as a laptop computer, or any device such as a car or an appliance that includes computing abilities. The device 1201 includes a web browser 1202 operating on the device and an operating system 1203 operating the device. More broadly speaking, the dashed line 1204 represents that all of these devices may be owned by or may otherwise be under the control of the DID owner 1101.

The environment 1200 also includes a DID management module 1220. In operation, as represented by respective arrows 1201a, 1202a and 1203a, the DID management module 1220 resides on and is executed by one or more of user device 1201, web browser 1202, and the operating system 1203. Accordingly, the DID management module 1220 is shown as being separate for ease of explanation. The DID management module 1220 may be also described as a "wallet" in that it can hold various claims made by or about a particular DID. In one example, the DID management module 1220 is structured as described above for the executable component 1306.

As shown in FIG. 12, the DID management module 1220 includes a DID creation module 1230. The DID creation module 1230 may be used by the DID owner 1101 to create the DID 1105 or any number of additional DIDs, such as DID 1231. In one embodiment, the DID creation module may include or otherwise have access to a User Interface (UI) element 1235 that may guide the DID owner 1101 in creating the DID 1105. The DID creation module 1230 has one or more drivers that are configured to work with specific distributed ledgers such as distributed ledger 1120 so that the DID 1105 complies with the underlying methods of that distributed ledger.

A specific embodiment will now be described. For example, the UI 1235 may provide a prompt for the user to enter a user name or some other human recognizable name. This name may be used as a display name for the DID 1105 that will be generated. As previously described, the DID 1105 may be a long string of random numbers and letters and so having a human-recognizable name for a display name may be advantageous. The DID creation module 1230 may then generate the DID 1105. In the embodiments having the UI 1235, the DID 1105 may be shown in a listing of identities and may be associated with the human-recognizable name.

The DID creation module 1230 may also include a key generation module 1250. The key generation module may generate the private key 1106 and public key 1107 pair previously described. The DID creation module 1230 may then use the DID 1105 and the private and public key pair to generate the DID document 1110.

In operation, the DID creation module 1230 accesses a registrar 1210 that is configured to the specific distributed ledger that will be recording the transactions related to the DID 1105. The DID creation module 1230 uses the registrar 1210 to record DID hash 1131, DID hash 1141, and DID hash 1151 in the distributed ledger in the manner previously described, and to store the DID document 1110 in the manner previously described. This process may use the public key 1107 in the hash generation.

In some embodiments, the DID management module 1220 may include an ownership module 1240. The ownership module 1240 may provide mechanisms that ensure that the DID owner 1101 is in sole control of the DID 1105. In this way, the provider of the DID management module 1220 is able to ensure that the provider does not control the DID 1105, but is only providing the management services.

The key generation module 1250 generates the private key 1106 and public key 1107 pair and the public key 1107 is then recorded in the DID document 1110. Accordingly, the public key 1107 may be used by all devices associated with the DID owner 1101 and all third parties that desire to provide services to the DID owner 1101. Accordingly, when the DID owner 1101 desires to associate a new device with the DID 1105, the DID owner 1101 may execute the DID creation module 1230 on the new device. The DID creation module 1230 may then use the registrar 1210 to update the DID document 1110 to reflect that the new device is now associated with the DID 1105, which update would be reflected in a transaction on the distributed ledger 1120.

In some embodiments, however, it may be advantageous to have a public key per device 1201 owned by the DID owner 1101 as this may allow the DID owner 1101 to sign with the device-specific public key without having to access a general public key. In other words, since the DID owner 1101 will use different devices at different times (for example using a mobile phone in one instance and then using a laptop computer in another instance), it is advantageous to have a key associated with each device to provide efficiencies in signing using the keys. Accordingly, in such embodiments, the key generation module 1250 generates additional public keys 1108 and 1109 when the additional devices execute the DID creation module 1230. These additional public keys may be associated with the private key 1106 or in some instances may be paired with a new private key.

In those embodiments where the additional public keys 1108 and 1109 are associated with different devices, the additional public keys 1108 and 1109 are recorded in the DID document 1110 as being associated with those devices, as shown in FIG. 12. The DID document 1110 may include the information (information 1105, 1107 and 1111 through 1116) previously described in relation to FIG. 11 in addition to the information (information 1108, 1109 and 1265) shown in FIG. 12. If the DID document 1110 existed prior to the device-specific public keys being generated, then the DID document 1110 would be updated by the creation module 1230 via the registrar 1210 and this would be reflected in an updated transaction on the distributed ledger 1120.

In some embodiments, the DID owner 1101 may desire to keep secret the association of a device with a public key or the association of a device with the DID 1105. Accordingly, the DID creation module 1230 may cause that such data be secretly shown in the DID document 1110.

As described thus far, the DID 1105 has been associated with all the devices under the control of the DID owner 1101, even when the devices have their own public keys. However, in some embodiments, each device or some subset of devices under the control of the DID owner 1101 may each have their own DID. Thus, in some embodiments the DID creation module 1230 may generate an additional DID, for example DID 1231, for each device. The DID creation module 1230 would then generate private and public key pairs and DID documents for each of the devices and have them recorded on the distributed ledger 1120 in the manner previously described. Such embodiments may be advantageous for devices that may change ownership as it may be possible to associate the device-specific DID to the new owner of the device by granting the new owner authorization rights in the DID document and revoking such rights from the old owner.

As mentioned, to ensure that the private key 1106 is totally in the control of the DID owner 1101, the private key 1106 is created on the user device 1201, browser 1202, or operating system 1203 that is owned or controlled by the DID owner 1101 that executed the DID management module 1220. In this way, there is little chance that a third party (and most consequentially, the provider of the DID management module 1220) will gain control of the private key 1106.

However, there is a chance that the device storing the private key 1106 may be lost by the DID owner 1101, which may cause the DID owner 1101 to lose access to the DID 1105. Accordingly, in some embodiments, the UI 1235 includes the option to allow the DID owner 1101 to export the private key 1106 to an off device secured database 1205 that is under the control of the DID owner 1101. As an example, the database 1205 may be one of the identity hubs 1310 described below with respect to FIG. 13. A storage module 1280 is configured to store data (such as the private key 1106 or attestations made by or about the DID owner 1101) off device in the database 1205 or identity hubs 1310. In some embodiments, the private key 1106 is stored as a QR code that is scanned by the DID owner 1101.

In other embodiments, the DID management module 1220 may include a recovery module 1260 that may be used to recover a lost private key 1106. In operation, the recovery module 1260 allows the DID owner 1101 to select one or more recovery mechanisms 1265 at the time the DID 1105 is created that may later be used to recover the lost private key. In those embodiments having the UI 1235, the UI 1235 may allow the DID owner 1101 to provide information that will be used by the one or more recovery mechanisms 1265 during recovery. The recovery module 1260 may then be run on any device associated with the DID 1105.

The DID management module 1220 may also include a revocation module 1270 that is used to revoke or sever a device from the DID 1105. In operation, the revocation module uses the UI element 1235, which allows the DID owner 1101 to indicate a desire to remove a device from being associated with the DID 1105. In one embodiment, the revocation module 1270 accesses the DID document 1110 and causes that all references to the device be removed from the DID document 1110. Alternatively, the public key for the device may be removed, and this change is then reflected in the DID document 1110 may then be reflected as an updated transaction on the distributed ledger 1120.

Because the principles described herein are performed in the context of a computing system, some introductory discussion of a computing system will be described with respect to FIG. 13. Then, this description will return to the principles of a decentralized identifier (DID) platform with respect to the remaining figures.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 13:
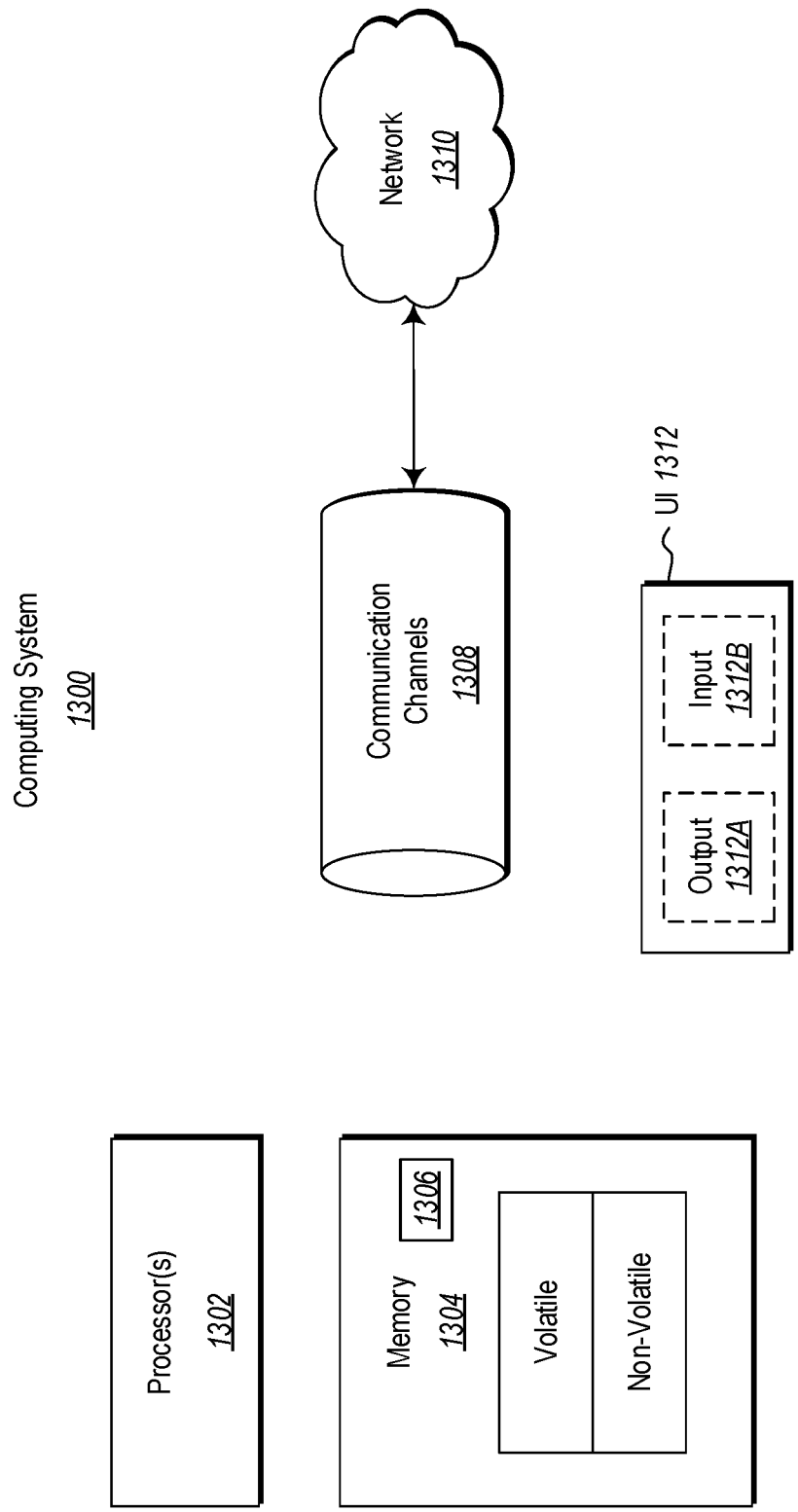
FIG. 13 illustrates an example computing system in which the principles described herein may be employed.

As illustrated in FIG. 13, in its most basic configuration, a computing system 1300 includes at least one hardware processing unit 1302 and memory 1304. The processing unit 1302 includes a general-purpose processor. Although not required, the processing unit 1302 may also include a field programmable gate array (FPGA), an application specific integrated circuit (ASIC), or any other specialized circuit. In one embodiment, the memory 1304 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 1300 also has thereon multiple structures often referred to as an "executable component".

For instance, the memory 1304 of the computing system 1300 is illustrated as including executable component 1306. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 1304 of the computing system 1300. Computing system 1300 may also contain communication channels 1308 that allow the computing system 1300 to communicate with other computing systems over, for example, network 1310.

While not all computing systems require a user interface, in some embodiments, the computing system 1300 includes a user interface system 1312 for use in interfacing with a user. The user interface system 1312 may include output mechanisms 1312A as well as input mechanisms 1312B. The principles described herein are not limited to the precise output mechanisms 1312A or input mechanisms 1312B as such will depend on the nature of the device. However, output mechanisms 1312A might include, for instance, speakers, displays, tactile output, virtual or augmented reality, holograms and so forth. Examples of input mechanisms 1312B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then be eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, an some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A computing system for acquiring and using a verifiable credential so as to restrict access to one or more verifiable claims of another verifiable credential, the computing system comprising:
   one or more processors; and
   one or more hardware storage devices that store instructions that are executable by the one or more processors to cause the computing system to:
      obtain a child verifiable credential that is derived from a parent verifiable credential and that includes a subset of verifiable claims that are in the parent verifiable credential, wherein the child verifiable credential is associated with usage data comprising an identity of a relying party to which the child verifiable credential was last exposed, wherein the subset of verifiable claims are represented by a data structure that includes a property name and a value for at least some verifiable claims in the subset of verifiable claims, and wherein obtaining the child verifiable credential includes:
         selecting the subset of verifiable claims from the parent verifiable credential;
         causing a request to be transmitted to a claims issuer computing system for the child verifiable credential that includes the selected subset of verifiable claims to be generated from the parent verifiable credential; and
         detecting receipt of the requested child verifiable credential; and
      expose the received child verifiable credential to a relying entity computing system so that the relying entity computing system can verify any of the selected subset of verifiable claims.

2. The computing system of claim 1, at least one of the subset of verifiable claims having a subject referenced by a decentralized identifier.

3. The computing system of claim 1, wherein the instructions are further executable to cause the computing system to:
   use the data structure to cause a visual representation to be displayed to a user, the visual representation representing the property name and the value for each of the subset of verifiable claims.

4. The computing system of claim 3, the visual representation comprising a human readable visual representation of the property name and the value for each of the subset of verifiable claims.

5. The computing system of claim 4, wherein a first value for a first property name includes a location that points to a second value for the first property name.

6. The computing system of claim 1, wherein the instructions are further executable to cause the computing system to:
   use the data structure to cause a visual representation to be displayed to a user, the visual representation representing the property name and the value for each of the subset of verifiable claims, the visual representation comprising a human readable visual representation of the property name and the value for each of the subset of verifiable claims.

7. The computing system of claim 3, the visual representation comprising a bar code or quick response (QR) code representation of instructions for verifying one or more of the verifiable claims.

8. The computing system of claim 3, wherein selecting the subset of verifiable claims occurs in response to detecting predetermined user interaction with the visual representation.

9. The computing system of claim 8, wherein the child verifiable credential is associated with usage data, and wherein the usage data comprises frequency with which the child verifiable credential is exposed to relying party computing systems.

10. The computing system of claim 8, wherein the child verifiable credential is associated with usage data, and wherein the usage data comprises a time that the child verifiable credential was last exposed.

11. The computing system of claim 3, the data structure further comprising usage data about the data structure.

12. The computing system of claim 1, wherein the parent verifiable credential includes a plurality of verifiable claims, which includes the subset of verifiable claims, and wherein each verifiable claim in the plurality of verifiable claims includes a corresponding proof instruction that is usable to verify that said each verifiable claim has not been tampered.

13. The computing system of claim 12, wherein at least one of the proofs is a digital signature.

14. The computing system of claim 1, wherein the parent verifiable credential is included in a portable identity card.

15. A method for acquiring and using a child verifiable credential that includes a selected subset of verifiable claims that are present within a parent verifiable credential from which the child verifiable credential is derived, the method comprising:
  obtaining a child verifiable credential that is derived from a parent verifiable credential and that includes a subset of verifiable claims that are in the parent verifiable credential, wherein the child verifiable credential is associated with usage data comprising an identity of a relying party to which the child verifiable credential was last exposed, wherein the subset of verifiable claims are represented by a data structure that includes a property name and a value for at least some verifiable claims in the subset of verifiable claims, and wherein obtaining the child verifiable credential includes:
  selecting the subset of verifiable claims from the parent verifiable credential;
  causing a request to be transmitted to a claims issuer computing system for the child verifiable credential that includes the selected subset of verifiable claims to be generated from the parent verifiable credential; and
  detecting receipt of the requested child verifiable credential; and
  exposing the received child verifiable credential to a relying entity computing system so that the relying entity computing system can verify any of the selected subset of verifiable claims.

16. The method of claim 15, at least one of the subset of verifiable claims having a subject referenced by a decentralized identifier.

17. The method of claim 15, the method further comprising:
  using the data structure to cause a visual representation to be displayed to a user, the visual representation representing the property name and the value for each of the subset of verifiable claims.

18. One or more hardware storage devices that store instructions that are executable by one or more processors to cause the one or more processors to:
  obtain a child verifiable credential that is derived from a parent verifiable credential and that includes a subset of verifiable claims that are in the parent verifiable credential, wherein the child credential is associated with usage data comprising an identity of a relying party to which the child verifiable credential was last exposed, wherein the subset of verifiable claims are represented by a data structure that includes a property name and a value for at least some verifiable claims in the subset of verifiable claims, and wherein obtaining the child verifiable credential includes:
  selecting the subset of verifiable claims from the parent verifiable credential;
  causing a request to be transmitted to a claims issuer computing system for the child verifiable credential that includes the selected subset of verifiable claims to be generated from the parent verifiable credential; and
  detecting receipt of the requested child verifiable credential; and
  expose the received child verifiable credential to a relying entity computing system so that the relying entity computing system can verify any of the selected subset of verifiable claims.

* * * * *